US008941615B2

(12) United States Patent
Sakuragi et al.

(10) Patent No.: US 8,941,615 B2
(45) Date of Patent: Jan. 27, 2015

(54) INFORMATION PROCESSING APPARATUS, INFORMATION PROCESSING METHOD, AND PROGRAM

(71) Applicant: Sony Corporation, Tokyo (JP)

(72) Inventors: Ryoichi Sakuragi, Kanagawa (JP); Atsushi Imai, Kanagawa (JP)

(73) Assignee: Sony Corporation, Tokyo (JP)

(*) Notice: Subject to any disclaimer, the term of this patent is extended or adjusted under 35 U.S.C. 154(b) by 135 days.

(21) Appl. No.: 13/670,747

(22) Filed: Nov. 7, 2012

(65) Prior Publication Data

US 2013/0120313 A1    May 16, 2013

(30) Foreign Application Priority Data

Nov. 15, 2011    (JP) .................................. 2011-249998

(51) Int. Cl.
*G06F 3/041*     (2006.01)
*G06F 3/0484*    (2013.01)
*G06F 3/0488*    (2013.01)
*G11B 27/031*    (2006.01)
*G11B 27/34*     (2006.01)

(52) U.S. Cl.
CPC ............ *G06F 3/0484* (2013.01); *G06F 3/0488* (2013.01); *G11B 27/031* (2013.01); *G11B 27/34* (2013.01)
USPC .......................................... 345/174; 345/178

(58) Field of Classification Search
CPC .............................. G06F 3/0484; G06F 3/0488
USPC .................... 345/156–184; 178/18.01–18.06, 178/19.01–19.06; 701/31.4, 532; 715/781
See application file for complete search history.

(56) References Cited

U.S. PATENT DOCUMENTS

| 6,215,485 | B1* | 4/2001 | Phillips .......................... 345/698 |
| 2008/0165136 | A1* | 7/2008 | Christie et al. ................ 345/173 |
| 2009/0146961 | A1* | 6/2009 | Cheung et al. ................ 345/172 |
| 2009/0243998 | A1* | 10/2009 | Wang ............................. 345/156 |
| 2010/0045705 | A1* | 2/2010 | Vertegaal et al. ............. 345/661 |
| 2010/0103118 | A1* | 4/2010 | Townsend et al. ............ 345/173 |
| 2010/0214232 | A1* | 8/2010 | Chan et al. ..................... 345/173 |
| 2011/0074710 | A1* | 3/2011 | Weeldreyer et al. .......... 345/173 |
| 2011/0113387 | A1* | 5/2011 | Yoshimi ........................ 715/856 |
| 2011/0115734 | A1* | 5/2011 | Harashima et al. ........... 345/173 |
| 2011/0175830 | A1* | 7/2011 | Miyazawa et al. ............ 345/173 |
| 2013/0120434 | A1* | 5/2013 | Kim ............................... 345/594 |
| 2013/0326583 | A1* | 12/2013 | Freihold et al. ................. 726/3 |

FOREIGN PATENT DOCUMENTS

JP            11-184356          7/1999

* cited by examiner

*Primary Examiner* — Prabodh M Dharia
(74) *Attorney, Agent, or Firm* — Frommer Lawrence & Haug LLP; William S. Frommer

(57) ABSTRACT

Provided is an information processing apparatus including a contact detection unit that detects coordinates of a position of a touch manipulation with respect to a touch panel, a storage unit that stores a table that is a command table relating to an editing process with respect to a material that is an element of content, and that at least includes a command to change a reproduction position of the material that is reproduced on a separate information processing apparatus, according to a distance that the touch manipulation moves, and a command specification unit that specifies the command issued to the separate information processing apparatus, from the table stored in the storage unit, based on a detection result obtained by the contact detection unit.

9 Claims, 17 Drawing Sheets

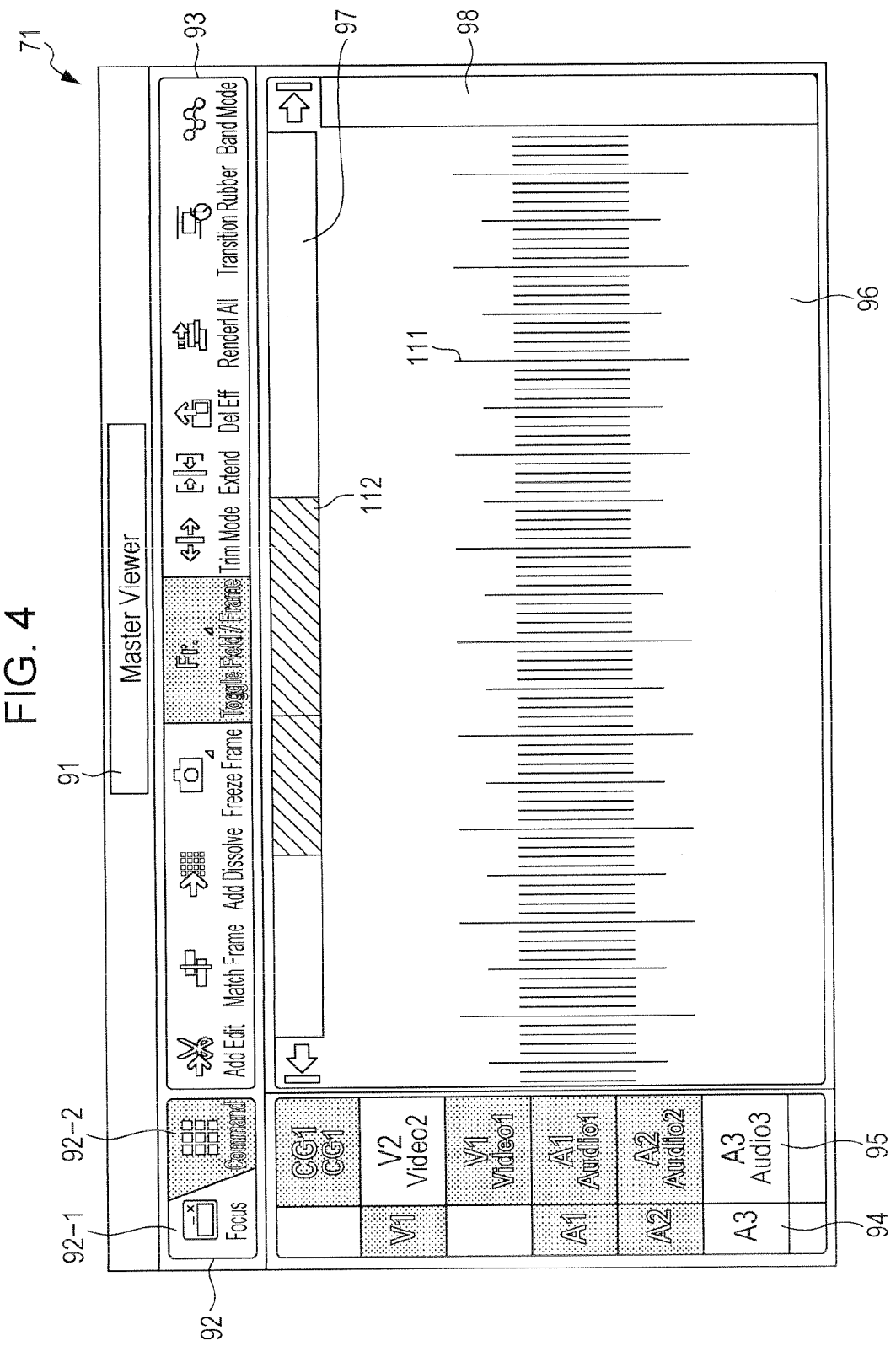

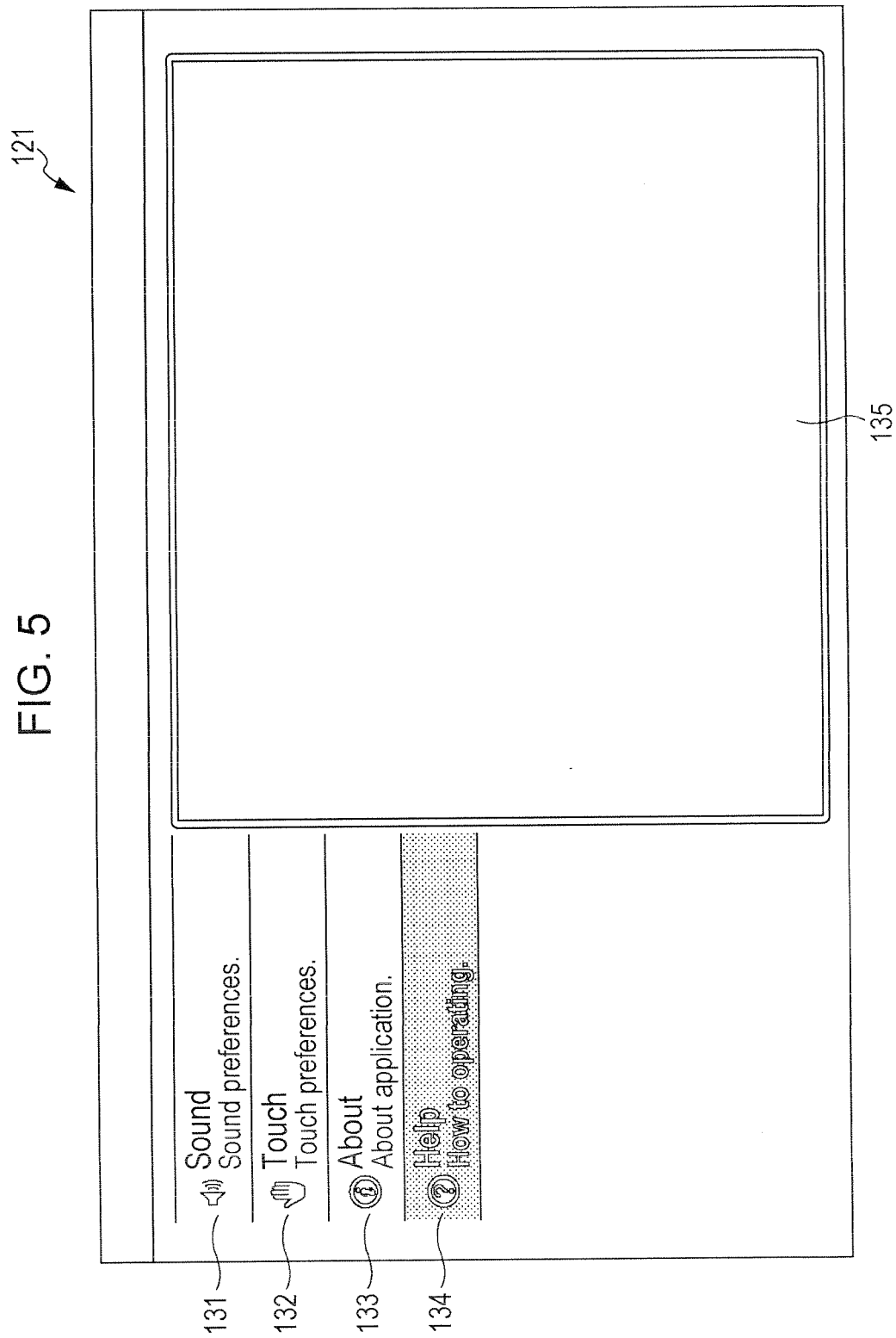

FIG. 6

TAP

- 151 — STOP — ONE FINGER TAP.

1.5 TAP (DOUBLE TAP + HOLD) + JOG

- 153 — SHUTTLE — ONE FINGER DOUBLE TAP AND HOLD

DOUBLE TAP

- 154 — PLAY — ONE FINGER DOUBLE TAP.
- 155 — MARK EVENT — TWO FINGERS DOUBLE TAP.
- 156 — CLEAR BOTH MARKS — THREE FINGERS DOUBLE TAP.
- 157 — FOCUS — FOUR FINGERS DOUBLE TAP.

FLICK (HORIZONTAL)

- 158 — JOG FORWARD — ONE FINGER FLICK TO RIGHT.
- 159 — JOG REVERSE — ONE FINGER FLICK TO LEFT.
- 160 — PLAY FORWARD — TWO FINGERS FLICK TO RIGHT. 1x, 2x, 4x, 8x, 16x, 32x.
- 161 — PLAY REVERSE — TWO FINGERS FLICK TO LEFT. -1x, -2x, -4x, -8x, -16x, -32x.
- 162 — SOURCE VIEWER — SWITCH FOCUS TO SOURCE VIEWER. THREE FINGERS FLICK TO RIGHT.
- 163 — MASTER VIEWER — SWITCH FOCUS TO MASTER VIEWER. THREE FINGERS FLICK TO LEFT.
- 164 — REDO — FOUR FINGERS FLICK TO RIGHT.
- 165 — UNDO — FOUR FINGERS FLICK TO LEFT.

FLICK (VERTICAL)

- 166 — SPLICE-IN — TWO FINGERS FLICK TO DOWN.
- 167 — OVERWRITE — THREE FINGERS FLICK TO DOWN.
- 168 — EXTRACT — TWO FINGERS FLICK TO UP.
- 169 — LIFT — THREE FINGERS FLICK TO UP.
- 170 — PASTE — FOUR FINGERS FLICK TO DOWN.
- 171 — OUT — FOUR FINGERS FLICK TO UP.

HOLD AND TAP (ONE FINGER TAP, OTHER FINGERS HOLD)

- 172 — STEP BACKWARD — RIGHT FINGER HOLD, LEFT FINGER TAP.
- 173 — STEP FORWARD — LEFT FINGER HOLD, RIGHT FINGER TAP.
- 174 — GO TO PREVIOUS EVENT — RIGHT TWO FINGERS HOLD, LEFT FINGER TAP.
- 175 — GO TO NEXT EVENT — LEFT TWO FINGERS HOLD, RIGHT FINGER TAP.

HOLD AND TAP (ONE FINGER TAP, OTHER FINGERS HOLD)

- 177 — STEP BACKWARD 10 FRAMES.
- 178 — STEP FORWARD 10 FRAMES.

HOLD AND FLICK (VERTICAL)

- 179 — MARK IN — LEFT FINGER FLICK TO DOWN, RIGHT ONE FINGER HOLD.
- 180 — MARK OUT — LEFT FINGER HOLD, RIGHT ONE FINGER FLICK TO DOWN.
- 181 — CLEAR MARK IN — RIGHT FINGER FLICK TO UP, LEFT ONE FINGER HOLD.
- 182 — CLEAR MARK OUT — RIGHT FINGER FLICK TO UP, LEFT ONE HOLD.
- 183 — EXTRACT FROM EVENT TOP TO CURRENT P. — LEFT TWO FINGERS FLICK TO UP, RIGHT ONE FINGER HOLD.
- 184 — EXTRACT FROM CURRENT TOP TO EVENT END — RIGHT TWO FINGERS FLICK TO UP, LEFT ONE FINGER HOLD.
- 185 — LIFT FROM EVENT TOP TO CURRENT P. — LEFT FINGER FLICK TO UP, RIGHT TWO FINGERS HOLD.
- 186 — LIFT FROM CURRENT P. TO EVENT END — RIGHT FINGER FLICK TO UP, LEFT TWO FINGERS HOLD.
- 187 — ADD EDIT — LEFT AND RIGHT FINGERS HOLD, THE MIDDLE FINGER FLICK TO DOWN.

HOLD AND FLICK (HORIZONTAL)

- 188 — GO TO OUT — ONE FINGER FLICK TO RIGHT, OTHER ONE FLICK TO LEFT.
- 189 — GO TO IN — ONE FINGER HOLD, OTHER ONE FLICK TO LEFT.
- 190 — GO TO END — TWO FINGERS HOLD, OTHER ONE FLICK TO RIGHT.
- 191 — GO TO HOME — TWO FINGERS HOLD, OTHER ONE FLICK TO LEFT.
- 192 — FORWARD 1.5 — THREE FINGERS HOLD, OTHER ONE FLICK TO RIGHT.
- 193 — REWIND 1.5 — THREE FINGERS HOLD, OTHER ONE FLICK TO LEFT.

ZOOM IN/OUT

- 194 — ZOOM IN — TWO FINGERS PINCH-OUT (HORIZONTAL).
- 195 — ZOOM OUT — TWO FINGERS PINCH-IN (HORIZONTAL).
- 196 — ZOOM IN — TWO FINGERS PINCH-OUT (VERTICAL).
- 197 — ZOOM OUT — TWO FINGERS PINCH-IN (VERTICAL).

- 221 — HOLD
- 222 — DOUBLE TAP
- 223 — TAP
- 224 — DOUBLE TAP AND HOLD
- 225 — FLICK TO DOWN
- 226 — FLICK TO UP
- 227 — FLICK TO LEFT
- 228 — FLICK TO RIGHT

FIG. 7

| | CUT EDITING | 1 FINGER | 2 FINGERS | | 3 FINGERS | | | 4 FINGERS |
|---|---|---|---|---|---|---|---|---|
| | | | LEFT | RIGHT | LEFT | CENTER | RIGHT | |
| 1 | TAP | STOP | | | | | | |
| 2 | 1.5 TAP (DOUBLE TAP AND HOLD+JOG) | SHUTTLE | | | | | | |
| 3 | DOUBLE TAP | STOP→PLAY | MARK EVENT | | CLEAR MARK IN/OUT | | | FOCUS |
| 4 | FLICK (HORIZONTAL) | | PLAY FORWARD/REVERSE (1×, 2×, 4×, 8×, 16×, 32×, −1×, −2×, −4×, −8×, −16×, −32×) | | SV (TO LEFT) MV (TO RIGHT) | | | UNDO (TO LEFT) REDO (TO RIGHT) |
| 5 | FLICK (VERTICAL) | | SPLICE-IN: (TO DOWN) EXTRACT: (TO UP) | | OVERWRITE: (TO DOWN) LIFT: (TO UP) | | | PASTE: (TO DOWN) CUT: (TO UP) |
| 6 | HOLD AND TAP (ONE FINGER TAP) (OTHER FINGERS HOLD.) | | 1 FRAME BACKWARD (TAP LEFT) | 1 FRAME FORWARD (TAP RIGHT) | PREV EVENT (TAP 1 LEFT) | | NEXT EVENT (TAP 1 RIGHT) | |
| 7 | HOLD AND TAP (ONE FINGER HOLD.) (OTHER FINGERS TAP.) | | | | 10 FRAMES BACKWARD (TAP 2 LEFT) | | 10 FRAMES FORWARD (TAP 2 RIGHT) | |
| 8 | HOLD AND FLICK (VERTICAL) (ONE FINGER HOLD.) (OTHER FINGERS FLICK.) | | MARK IN (TO DOWN) CLEAR IN (TO UP) | MARK OUT (TO DOWN) CLEAR OUT (TO UP) | EXTRACT FROM EVENT HEAD TO CURRENT POSITION (FLICK UP 2 LEFT) | | EXTRACT FROM CURRENT POSITION TO EVENT END (FLICK UP 2 RIGHT) | |
| 9 | HOLD AND FLICK (VERTICAL) (ONE FINGER FLICK.) (OTHER FINGERS HOLD.) | | | | | ADD EDIT (FLICK DOWN) (CENTER) | | |
| 10 | HOLD AND FLICK (VERTICAL) (TWO FINGERS HOLD.) (OTHER FINGERS FLICK.) | | | | LIFT FROM EVENT HEAD TO CURRENT POSITION (FLICK UP 1 LEFT) | | LIFT FROM CURRENT POSITION TO EVENT END (FLICK UP 1 RIGHT) | |
| 11 | HOLD AND FLICK (HORIZONTAL) (ONE FINGER HOLD.) (OTHER FINGERS FLICK.) | | GO TO IN GO TO OUT | | HOME (TO LEFT) END (TO RIGHT) | | | |
| 12 | HOLD AND FLICK (HORIZONTAL) (ONE FINGER FLICK.) (OTHER FINGERS HOLD.) | | ZOOM IN/OUT (HORIZONTAL) ZOOM TRACK HEIGHT (VERTICAL) | | | | | FWD 1.5 (TO LEFT) REV 1.5 (TO RIGHT) |
| 13 | PINCH IN/OUT | | | | | | | |

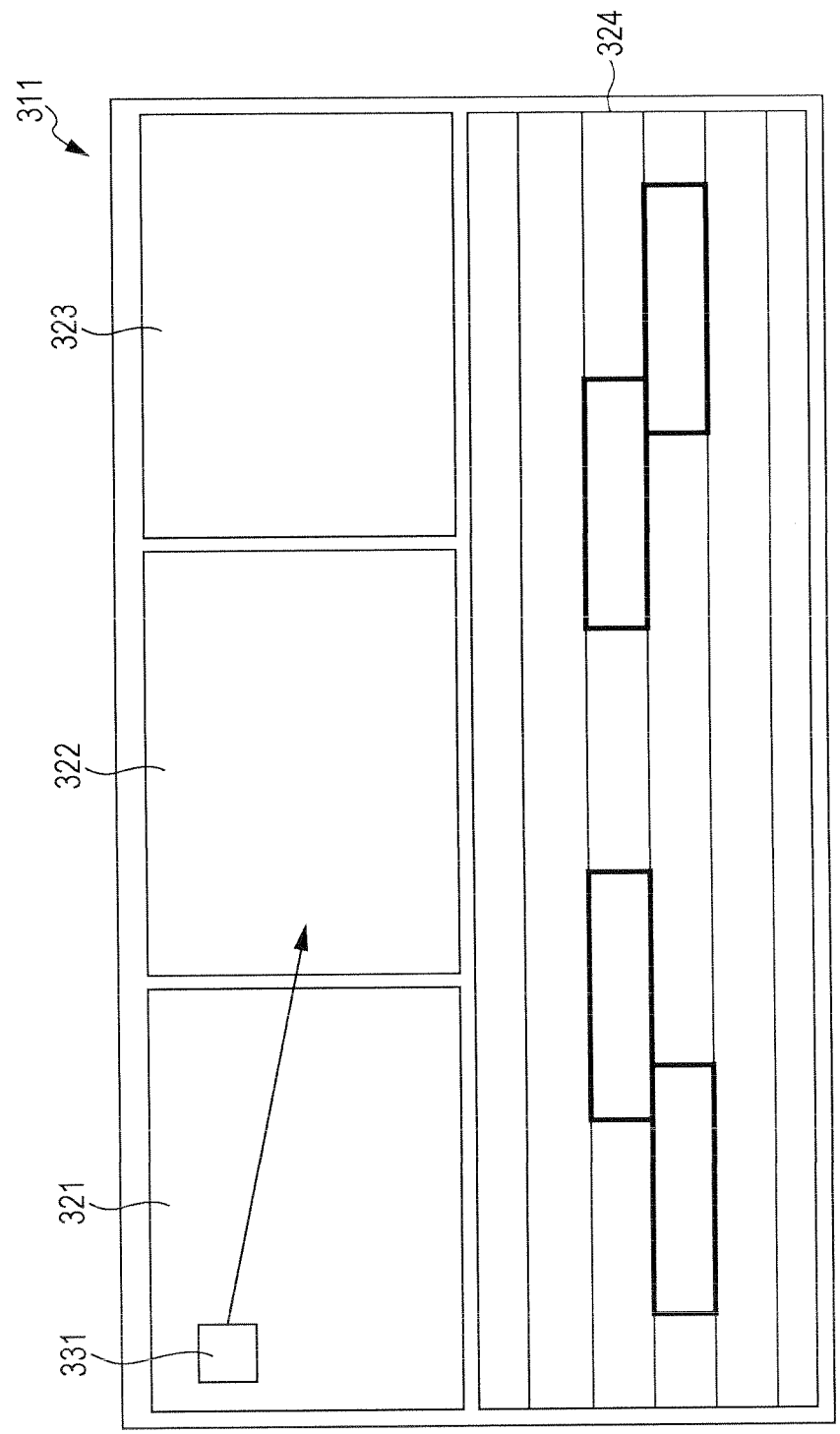

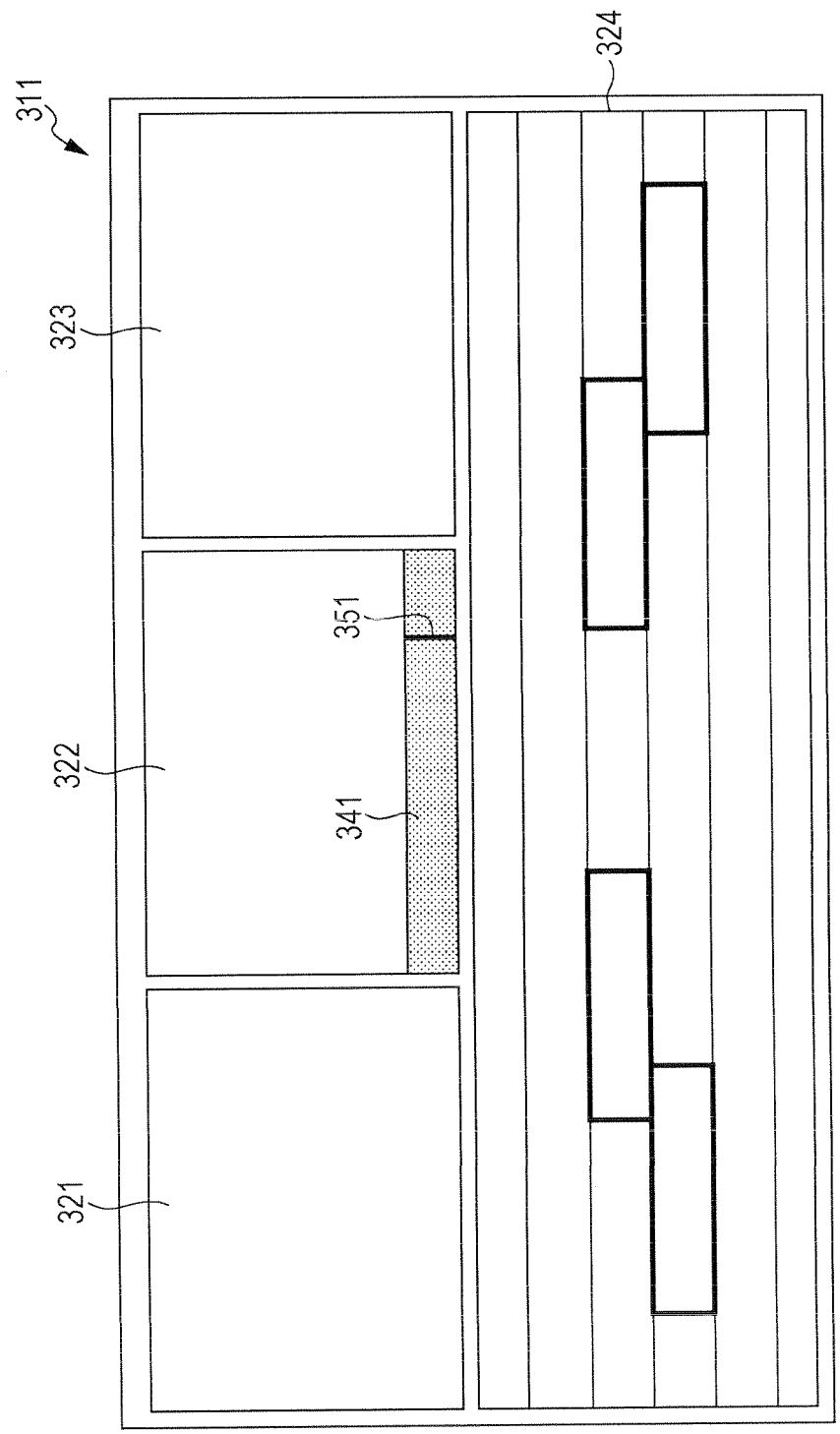

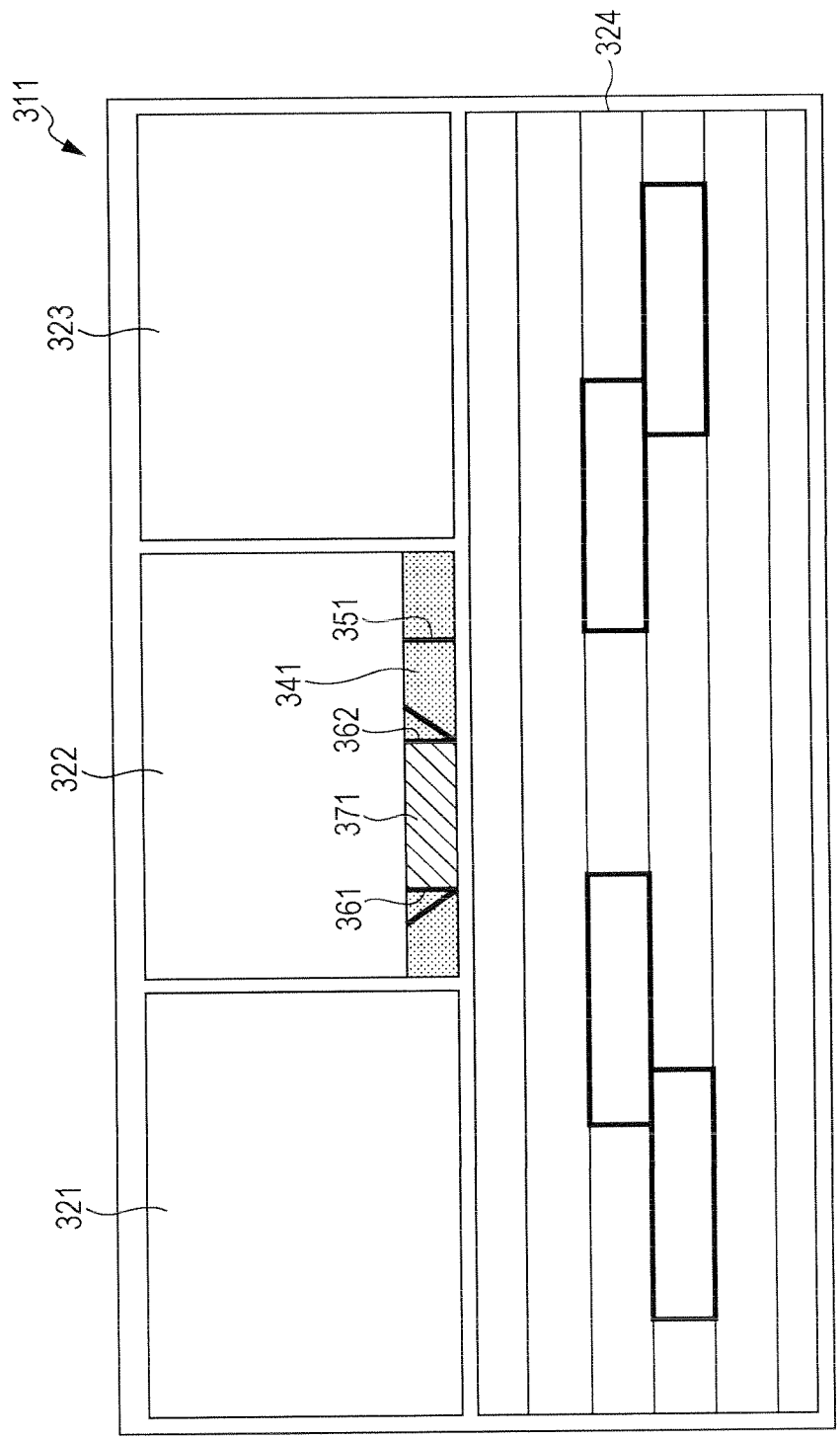

INFORMATION PROCESSING APPARATUS, INFORMATION PROCESSING METHOD, AND PROGRAM

BACKGROUND

The present technology relates to an information processing apparatus, an information processing method and a program, and particularly to an information processing apparatus, an information processing method and a program that are capable of performing an editing task with an intuitive manipulation.

In the related art, an editor produced content data by performing an editing task with respect to a variety of materials using an editing apparatus in the field of content production. Here, the material is data that may be element stored on a storage medium, such as a disk, a tape, and a memory, and specifically means data of moving images, still images, a sound, or the like. Furthermore, for example, editing tasks include a cutting edit, a trimming edit, and the like with respect to the material imported into the editing apparatus.

The editor performs the editing tasks by manipulating a hardware manipulation tool of the editing apparatus, such as a keyboard, a mouse, a jog dial and a slide bar (for example, refer to Japanese Unexamined Patent Application Publication No. 11-18436). Furthermore, in recent years, there have been also a case where a software manipulation tool, such as a software button which substitutes for the hardware manipulation tool, is displayed on a display of the editing apparatus in such a manner that manipulation is possible using a GUI (a Graphical User Interface). That is, the editor may also perform the editing task, even by manipulating the software manipulation tool in this way.

SUMMARY

However, the editor should visually check the manipulation tool each time the manipulation is executed, in a case where the above-described manipulation tool of the related art, including a manipulation tool disclosed in Japanese Unexamined Patent Application Publication No, 11-184356, is used to perform the editing task. That is, the editor should observe the material of an editing object displayed on an editing screen, and thus has to take their eyes away from the material any number of times to visually check the manipulation tool each time the editor manipulates the manipulation tool used in the editing task. As a result, the editor may not avoid interruption of the editing task each time the editor checks the manipulation tool, and thus work efficiency decreases. Because of this, the advent of the editing apparatus has been anticipated which may perform the editing task with an intuitive manipulation while suppressing visual checking of the manipulation tool to the minimum limit necessary.

It is therefore desirable to perform the editing task with an intuitive manipulation.

According to an embodiment of the present technology, there is provided an including a contact detection unit that detects coordinates of a position of touch manipulation with respect to a touch panel, a storage unit that stores a table that is a command table relating to the editing process with respect to the material that is an element of content and at least includes a command to change a reproduction position of the material to be reproduced in a separate information processing apparatus according to a movement distance of the touch manipulation, and a command specification unit that specifies a command issued with respect to the separate information processing apparatus, in the table stored in the storage unit, based on a detection result obtained by the contact detection unit.

A finger number determination unit that determines the number of fingers used in the touch manipulation, based on the detection result obtained by the contact detection unit, and a touch manipulation type determination unit that determines a type of touch manipulation, based on the detection result obtained by the contact detection unit may be further provided. The table may include a command that is mapped onto a predetermined combination of the number of fingers and the type of touch manipulation. The command specification unit recognizes the combination of the number of fingers and the type of touch manipulation, based on a determination result obtained by each of the finger number determination unit and the touch manipulation type determination unit, and specifies a command corresponding to the recognized combination, from the table stored in the storage unit.

A command issuing unit may further be provided which issues the command specified by the command specification unit the separate information processing apparatus.

A sensitivity adjustment unit may further be provided which adjusts a sensitivity of the touch manipulation.

A display unit may further be provided which displays a predetermined image, and a display control unit may further be provided which performs the control to cause the display unit to display a manipulation screen configured to support the touch manipulation, based on the command specified by the command specification unit.

The touch manipulation may include a flick manipulation in which a finger is moved shortly and quickly in a predetermined direction and hold manipulation in which the finger remains stationary on the touch panel, and the table may include a command to set an IN point to a play line area of a region on which focus is set, in regions included in the manipulation screen, as a command mapped onto a combination of the flick manipulation in the downward direction using one left finger and the hold manipulation using one right finger.

The touch manipulation may include the flick manipulation in which the finger is moved shortly and quickly in the predetermined direction and the hold manipulation in which the finger remains stationary on the touch manipulation, and the table may include a command to set an OUT point to a play line area of a region on which focus is set, in a region included in the manipulation screen, as a command mapped onto a combination of the flick manipulation in the downward direction using one right finger and the hold manipulation using one left finger.

An information processing method of the information processing apparatus and a program, according to an embodiment of the present technology are a method and a program that correspond to the information processing apparatus according to an embodiment of the present technology described above.

In the information processing apparatus and method and the program, according to the embodiment of the present technology, coordinates of a position of touch manipulation with respect to a touch panel are detected, the number of fingers used in the touch manipulation is determined, based on a detection result, a type of touch manipulation is determined, based on the detection result, a command table, each of which is mapped onto a predetermined combination of the number of fingers and the type of touch manipulation is stored, the combination of the number of fingers and the type of touch manipulation is recognized, based on each determination result, and a command corresponding to the recognized combination is specified in the stored table.

As described above, according to the present technology, the editing task may be performed with an intuitive manipulation.

BRIEF DESCRIPTION OF THE DRAWINGS

FIG. 4 is a view illustrating an example of a manipulation screen;

FIG. 5 is a view illustrating an example of a setting screen;

FIG. 6 is a view illustrating an example of the manipulation screen;

FIG. 7 is a view illustrating a manipulation table of touch manipulation;

FIG. 8 is a view illustrating an example of an editing screen;

FIG. 9 is a view illustrating an example in which a material is displayed for a preview;

FIG. 10 is a view illustrating an example in which a to-use section is determined;

DETAILED DESCRIPTION OF EMBODIMENTS

Figure 1:
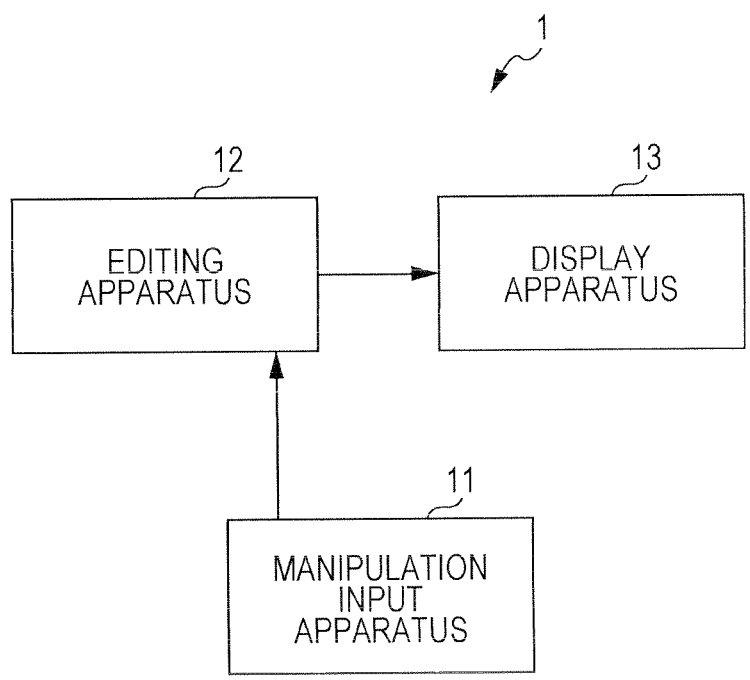
FIG. 1 is a block diagram illustrating a configuration of an editing system.

An embodiment of the present technology is described below referring to the drawings.
Configuration Example of Editing System to Which Present Technology is Applied FIG. 1 is a block diagram illustrating a configuration of an editing system to which the present technology is applied.

An editing system 1 includes a manipulation input apparatus 11, an editing apparatus 12, and a display apparatus 13.

The manipulation input apparatus 11 has a touch panel that is laminated on a display, as described below, and accepts manipulation that is executed by an editor's finger's approach to or contact with the corresponding touch panel. The manipulation input apparatus 11 specifies the detail of the corresponding manipulation, and issues a command to perform a predetermined editing process with respect to a variety of materials to the editing apparatus 12, based on the detail. Furthermore, a sequence of processes by the manipulation input apparatus 11 like this is referred to as a manipulation input process. The manipulation input process is described below.

The editing apparatus 12 performs an editing process with respect to a variety of materials according to the commands issued from the manipulation input apparatus 11.

The display apparatus 13 displays images which result from the editing process by the editing apparatus 12 with respect with a variety of materials, for example, an editing result and a variety of images of materials that are being edited.

Figure 2:
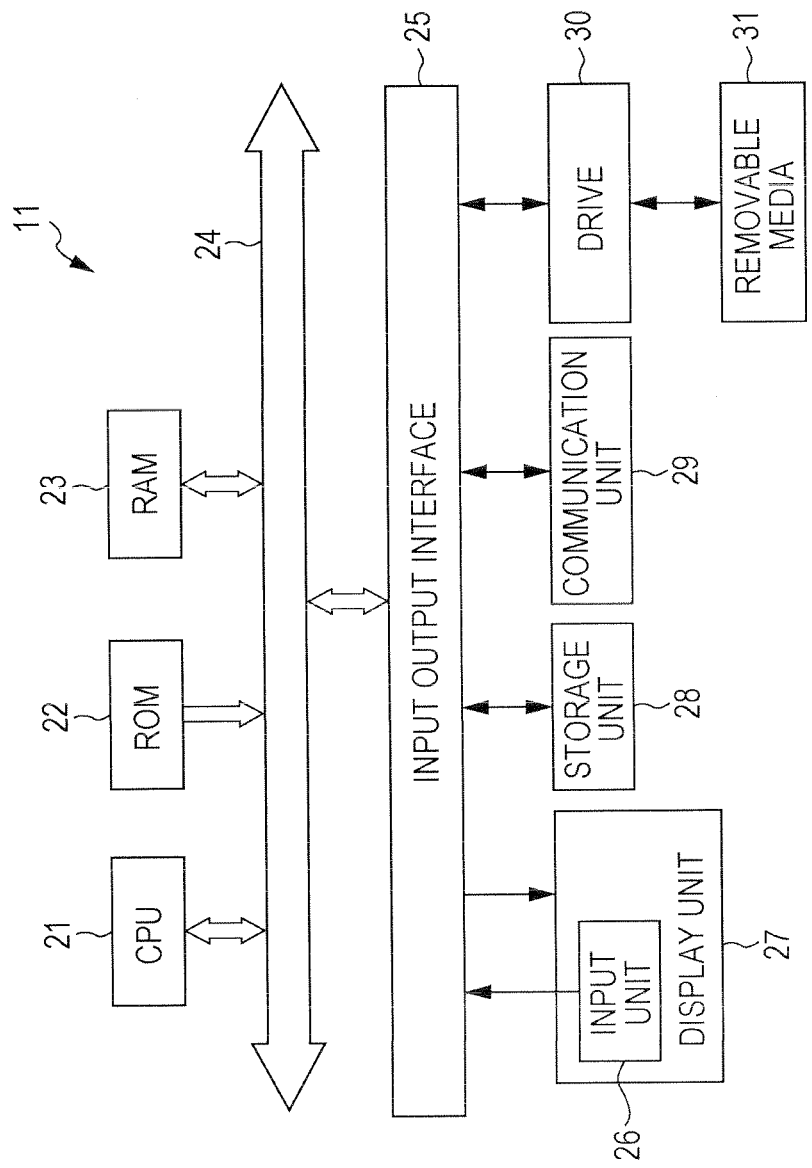
FIG. 2 is a block diagram illustrating a configuration example of hardware of a manipulation input apparatus.

Next, the manipulation input apparatus 11 is described referring to FIGS. 2 to 7.
Configuration Example of Manipulation Input Apparatus FIG. 2 is a block diagram illustrating a configuration example of the hardware of the manipulation input apparatus 11 to which the present technology is applied.

The manipulation input apparatus 11 includes a CPU (Central Processing Unit) 21, a ROM (Read Only Memory) 22, a RAM (Random Access Memory) 23, a bus 24, an input and output interface 25, an input unit 26, a display unit 27, a storage unit 28, a communication unit 29 and a drive 30.

The CPU 21 performs a variety of processes according to a program stored in the ROM 22. Furthermore, the CPU 21 performs a variety of processes according to a program loaded from the storage unit 28 into the RAM 23. In the RAM 23, data is also properly stored, which is necessary for the CPU 21 to perform the variety of processes.

The CPU 21, the ROM 22, and the RAM 23 are connected to each other via the bus 24. The input and output interface 25 is also connected to the bus 24. The input unit 26, the display unit 27, the storage unit 28, and the communication unit 29 are connected to the input and output interface 25.

The input unit 26 is configured to have a touch panel, and inputs a variety of information according to command manipulation by the editor. The display unit 27 is configured to have the display, and displays a variety of images.

More specifically, the input unit 26, operable as the touch panel, is laminated on the upper part of the entire display screen of the display unit 27, detects coordinates of a position where touch manipulation is executed, and supplies such a detection result to the CPU 21 via the input and output interface 25 and the bus 24. At this point, the touch manipulation means the editor's finger's approach to or contact with the touch panel. However, only the touch manipulation by the finger's contact is described below for the sake of the simple description, but the process described below may be also performed with the touch manipulation by the finger's approach in the same way.

For example, an electrostatic capacity type touch panel and a resistive film type touch panel may be employed as the touch panel making up the input unit 26. The electrostatic capacity type touch panel is formed from a conductive film on the display screen of the display unit 27. The electrostatic capacity type touch panel detects the coordinates of the position of the touch manipulation, based on a change in an electrostatic capacity that occurs between a fingertip and a conductive film when the manipulation by the finger is executed. In the resistive film type touch panel, a soft surface film like PET (polyethylene terephthalate) and a liquid crystal glass film that is inwardly positioned with respect to the surface film are in parallel formed on the display screen of the display unit 27, in such a manner as to overlap each other. A transparent conductive film is attached to each of both of the films, respectively, and both of the films are electrically insulated from each other via a transparent spacer. A conductor passes through each of the surface film and the glass film, and when the touch manipulation by the finger is executed, the surface film is bent by the finger stress, and the surface film and the glass film are partly in a conductive state. At this time, an electric resistance value and electric potential change according to a contact position of the finger. The CPU 11 causes the contact of the corresponding finger, the number of the contact of the finger and a type of touch manipulation to be detected, based on the coordinates at which changes in the electric resistance value and the potential like this occur.

The storage unit 28 is configured to have, for example, a hard disk and the like, and stores a variety of information. For example, data on the content of the editing object is stored in the storage unit 28, throughout the pre- and post-editing. Furthermore, the storage unit 28 stores a manipulation table of the touch manipulation which is described below referring to FIG. 7.

The communication unit 29 is configured to have, for example, a modem, and a terminal adapter and the like, and controls communication performed between a separate apparatus (not illustrated) over a network, including the Internet.

The drive 30 is also connected to the input and output interface 25, whenever necessary, and a removable media 31 such as a magnetic disk, an optical disc, an optical magnetic disk, or a semiconductor memory is also properly mounted on the input and output interface 25. Then, a computer program read out therefrom is installed in the storage unit 28 whenever necessary.

Functional Configuration Example of CPU

Figure 3:
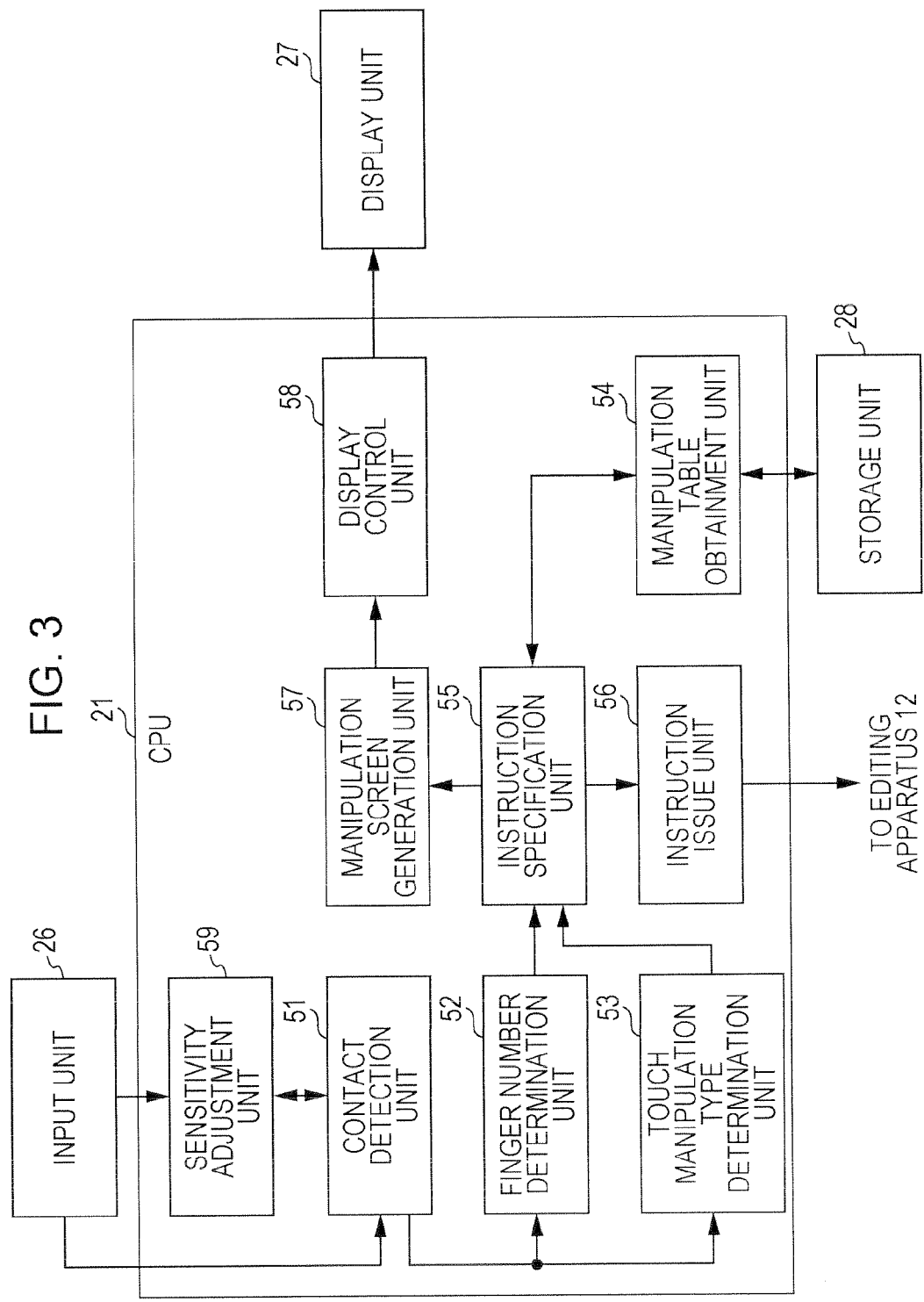
FIG. 3 is a block diagram illustrating a functional configuration example of a CPU.

FIG. 3 is a block diagram illustrating a functional block diagram of a functional configuration example to accomplish a function of performing the manipulation input process, among functions that the CPU 21 of the manipulation input apparatus 11 illustrated in FIG. 2 has.

The CPU 21 has a contact detection unit 51, a finger number determination unit 52, a touch manipulation type determination unit 53, a manipulation review obtainment unit 54, a command specification unit 55, a command issuing unit 56, a manipulation screen generation unit 57, a display control unit 58, and a sensitivity adjustment unit 59.

The contact detection unit 51 detects the position of the contact of a finger with respect to the touch panel as the input unit 26, that is, the coordinates of the position of the touch manipulation.

The finger number determination unit 52 determines the number of fingers that come into contact with the touch panel, that is, the number of fingers that are used in the touch manipulation, based on the detection result obtained by the contact detection unit 51.

The touch manipulation type determination unit 53 determines the type of touch manipulation of the touch panel, based on the detection result obtained by the contact detection unit 51. A transition in the detection result over time is included in the detection result obtained by the contact detection unit 51. Furthermore, the type of touch manipulation is described below referring to FIGS. 6 and 7.

The manipulation table obtainment unit 54 obtains the manipulation table of the touch manipulation stored in the storage unit 28. The manipulation table of the touch manipulation means a table in which the commands, each being mapped onto a predetermined combination of the number of fingers and the type of touch manipulation are enumerated every multiple combinations. The command relating to the editing process with respect to the material is included in the manipulation table of the touch manipulation. A specific example of the manipulation table of the touch manipulation is described below referring to FIG. 7

The command specification unit 55 recognizes the combination of the number of fingers and the type of touch manipulation, based on determination results obtained by the finger number determination unit 52 and the touch manipulation type determination unit 53, and specifies a command corresponding to the corresponding combination, in the manipulation table obtained by the manipulation table obtainment unit 54.

The command issuing unit 56 issues the command specified by the command specification unit 55 to the editing apparatus 12.

The manipulation screen generation unit 57 generates data on a manipulation screen as a GUI image configured to support the touch manipulation by the editor, based on the command specified by the command specification unit 55 and a variety of information.

The display control unit 58 performs control in such a manner that the manipulation screen generated as the data by the manipulation screen generation unit 57 is displayed on the display unit 27.

The sensitivity adjustment unit 59 adjusts the sensitivity of the touch manipulation of the touch panel as the input unit 26.

Manipulation Screen

Next, an example of the manipulation screen is described which is displayed on the display unit 27 of the manipulation input apparatus 11.

FIG. 4 is a view illustrating an example of a manipulation screen 71.

A focus-region display region 91, a list exchange region 92, a list display region 93, a first material display region 94, a second material display region 95, a manipulation region 96, a horizontal direction scrub region 97, and a vertical direction display adjustment region 98 are included in the screen 71 illustrated in FIG. 4.

A name of a region (hereinafter referred to as a focus region), region on which focus is set, is displayed in the focus-region display region 91, in the region included in an editing screen (described below referring to FIGS. 8 to 12) displayed on the display apparatus 13. Furthermore, in the manipulation screen 71, the manipulation is performed on the corresponding focus region.

In the list exchange region 92, a focus button 92-1 and a command button 92-2 are displayed. In a case where the focus button 92-1 is selected, a focus list is displayed in the list display region 93. The focus list is a list relating to the name of the region that may be the focus region, in the region in the editing screen. On the other hand, in a case where the focus button 92-2 is selected, the command list is displayed in the list display region 93. The command list is a list that mainly relates to the editing process. In an example in FIG. 4, the command button 92-2 is selected.

In the list display region 93, the focus list or the command list is displayed which corresponds to the focus button 92-1 or the command button 92-2 selected in the list exchange region 92, respectively. The editor may set the focus region by selecting a desired list from in the focus list displayed. Furthermore, the editor may perform a main editing process by selecting a desired list from in the command list displayed. In an example in FIG. 4, the command list is displayed in the list display region 93. For example, in a case where "Trim Mode", the sixth item from the right is selected from the command list, the editing mode of the editing screen is changed to the trimming editing mode. Accordingly, the editor may perform the trimming edit of performing a fine adjustment of a link to the material. Furthermore, the trimming edit is described below referring to FIG. 13.

The name of the data included in the material read out into the input material check region (an input material check region 322 in FIG. 8 in the present embodiment), is displayed in the first material display region 94, among the regions included in the editing screen displayed on the display apparatus 13. The material selected from among the materials stored in the editing apparatus 12 is displayed as the input material, in the input material check region, as described below referring to FIG. 8. The input material is configured by arbitrarily combining CG (Character Generator) data, image data (that is, still image data or moving image data), audio data and the like. From the example it is understood that the data included in the material read into the input material check region is image data V1, audio data A1, and audio data A2.

The name of the data included in the material read out into the output material check region (an output material check region 323 in FIG. 8 in the present embodiment) is displayed in the second material display region 95, among the regions included in the editing screen displayed on the display apparatus 13. The at-editing or post-editing material is displayed in the output material check region, as described referring to FIG. 8. The at-editing or post-editing material is configured by arbitrarily combining the CG data, the image data (that is, the still image data or the moving image data), the audio data and the like. From the example in FIG. 4, it is understood that the data included in the material read out into the output material check region is CG data CG1 and the image data V1, the audio data A1, and the audio data A2.

The manipulation region 96 is a region in the form of a rectangle, where the touch manipulation is executed to input the command. Multiple graduations 111 are marked almost in parallel with the short-side direction in the manipulation region 96. Furthermore, for the sake of simple description, according to the direction in FIG. 4, the short-side direction of the manipulation region 96 is defined as the vertical direction, and the long-side direction (the longitudinal direction) of the manipulation region 96 is defined as the horizontal direction.

The distance between two graduations 111 corresponds to a display of one frame of the material being reproduced in the focus region. The command to change the reproduction position of the material that is reproduced in the focus region is issued according to the distance (hereinafter referred to as a jog amount) that the finger moves with coming into contact with the manipulation region 96, by executing the type of touch manipulation in which the finger is traced on the corresponding graduation 111 in the horizontal direction (This type of touch manipulation tracing the finger like this is hereinafter referred to as a jog manipulation.).

That is, in a case where the reproduction position of the material that is reproduced in the focus region is changed, the editor may designate only the relative movement distance with respect to the present reproduction position of the material by changing the jog amount of the jog manipulation. Due to the jog manipulation, the reproduction position of the material changes by frame unit at a variable speed. Furthermore, the multiple graduations 111 also move as one body by only the distance according to the jog amount, in the horizontal direction, in the manipulation region 96. For example, in a case where under the assumption that the distance between two graduations 111 showing a predetermined frame is positioned in the central portion of the manipulation region 96, the jog manipulation is executed which moves the finger by the predetermined jog amount in the horizontal right direction, the multiple graduations 111 move as one body, in such a manner that the corresponding two graduations 111 are arranged at the position which is separated from the central portion in the horizontal right direction by the distance according to the predetermined jog amount.

Accordingly, for example, the editor may execute the jog manipulation by a small jog amount, in a case where the reproduction of the material in the focus region is skipped over slowly by one frame and the material in the focus region is reproduced. Additionally, the editing process is executed with respect to a variety of material, by a predetermined touch manipulation being performed in the manipulation region 96. Like this, since the editor may perform the editing task with an intuitive manipulation, a visual check may not be frequently made of the manipulation input apparatus 11 while the editing task is in process.

The horizontal direction scrub region 97 shows the whole time length of the focus region. For example, in a case where the focus region is the input material check region in the editing screen, the horizontal direction scrub region 97 shows the whole time length of the material read out into the input material check region. Furthermore, for example, in a case where the focus region is the output material check region in the editing screen, the horizontal direction scrub region 97 shows the whole time length of the at-editing or post-editing material. Furthermore, for example, in a case where the focus region is a timeline region (a timeline region 324 in FIG. 8 in the present embodiment) in the editing screen, the horizontal direction scrub region 97 is included in the corresponding timeline and shows the whole time length of the timeline. That is, the whole section (the length of the horizontal direction scrub region 97 in the horizontal direction) of the horizontal direction scrub region 97 is a section corresponding to the whole time length of the timeline.

The timeline expressing a time axis of the content created by the editor is included in a timeline region, as described below referring to FIG. 8. An arrangement of the at-editing or post-editing event and the detail of the editing process are diagrammed in time series for every track and is displayed in the timeline. The track is a region configured to arrange and edit the event. The event means a logical material that retains time data on two points, an IN point and an OUT point, which are set with respect to information on the material of a reference source and the corresponding material. Furthermore, the event is employed as a unit of the editing process that uses the editing system 1.

Furthermore, a display section 112 displayed in the horizontal direction scrub region 97 shows the time length of the material displayed currently in the focus region, or of the timeline. For example, in a case where the focus region is the input material check region in the editing screen, the display section 112 shows the time length of the material displayed in the input material check region. Furthermore, for example, in a case where the focus region is the output material check region in the editing screen, the display section 112 shows the time length of the at-editing or post-editing material displayed in the output material check region. Furthermore, for example, in a case where the focus region is the timeline, the display section 112 shows the time length of the timeline displayed in the timeline region.

Accordingly, in a case where the display section 112 is extended in the horizontal direction by a predetermined jog manipulation (a pinch out manipulation that belongs to pinch manipulation described below) with respect to the manipulation region 96, the focus region changes as follows. In a case where the focus region is the input material check region, a scope displayed in the input material check region, among the input materials, is expanded by the degree to which the display section 112 is extended. In a case where the focus region is the output material check region, a scope displayed in the output material check region, in the at-editing or post-editing material, is enlarged by the degree to which the display section 112 is extended. Furthermore, in a case where the focus region is the timeline region, a scope displayed in the timeline region, among the multiple tracks, is expanded by the degree to which the display section 112 is extended.

On the one hand, in a case where the display section 112 is reduced in the horizontal direction by a predetermined jog manipulation (a pinch in manipulation that belongs to the pinch manipulation described below) with respect to the manipulation region 96, the focus region changes as follows. In a case where the focus region is the input material check region, a scope displayed in the input material check region, in the input material, is reduced by the degree to which the display section 112 is reduced. In a case where the focus region is the output material check region, a scope displayed in the output material check region, in the at-editing or post-editing material, is reduced by the degree to which the display section 112 is reduced. Furthermore, in a case where the focus region is the timeline region, a scope displayed in the timeline region, among the multiple tracks, is reduced by the degree to which the display section 112 is reduced.

The vertical direction display adjustment region 98 is a region where the touch manipulation is executed to input the command to enlarge or reduce the vertical direction display of the timeline included in the timeline region. That is, when the vertical direction display adjustment region 98 is manipulated by a predetermined touch manipulation (the pinch manipulation described below) with respect to the manipulation region 96, the timeline is enlarged or reduced to be displayed in the timeline region.

Setting Screen

Next, a setting screen of the manipulation input apparatus 11 is described. The editor may perform a variety of settings such as changing a sound of the manipulation input apparatus 11 and the sensitivity of the touch manipulation by manipulating the corresponding setting screen. Furthermore, because there are multiple types of the touch manipulation with respect to the manipulation region 96, the editor may display the explanation screen of the touch manipulation by manipulating the corresponding setting screen.

FIG. 5 is a view illustrating an example of the setting screen.

A sound setting screen selection region 131, a touch manipulation setting screen selection region 132, an application explanation screen selection region 133, a touch manipulation explanation screen selection region 134, and a selection screen display region 135 are included in the setting screen 121 illustrated in FIG. 5.

When the touch manipulation is executed with respect to the sound setting screen selection region 131, a sound setting screen is selected and is displayed in the selection screen display region 135. In the sound setting screen, the setting of parameters is possible which adjusts, for example, the volume and the kind of an output sound from the manipulation input apparatus 11.

When the touch manipulation is executed by the touch manipulation with respect to the touch manipulation setting screen selection region 132, the touch manipulation setting screen is selected and is displayed in the selection screen display region 135. The setting of the parameter that adjusts, for example, the sensitivity of the touch manipulation, is possible in the touch manipulation setting screen. Furthermore, the parameter that adjusts for example, the sensitivity of the touch manipulation is described below.

When the touch manipulation is executed by the touch manipulation with respect to the application explanation screen selection region 133, the application explanation screen is selected and is displayed in the selection screen display region 135. An explanation of the application installed in the manipulation input apparatus 11 is displayed in the application explanation screen.

When the touch manipulation is executed by the touch manipulation with respect to the touch manipulation explanation screen selection region 134, the touch manipulation explanation screen is selected and is displayed in the selection screen display region 135. A schematic diagram of the touch manipulation is displayed in the touch manipulation explanation screen illustrated in FIG. 6.

Touch Manipulation Explanation Screen

FIG. 6 is a view illustrating an example of a touch manipulation explanation screen 141 displayed in the selection screen display region 135.

As illustrated in FIG. 6, a schematic diagram showing a combination of the type of touch manipulation and the number of fingers, a name of the corresponding predetermined command, and a specific explanation of the touch manipulation (or the detail of the corresponding predetermined command), which are mapped onto the predetermined command, are displayed in the touch manipulation explanation screen 141. Specifically, the schematic diagrams 151 to 197 illustrating each of the combinations of the type of touch manipulation and the number of fingers, which are mapped onto each of the commands, are displayed in the touch manipulation explanation screen 141. Then, a name of each of the corresponding commands is displayed below each of the corresponding schematic diagrams 151 to 197. Furthermore, the explanation of each of the specific manipulations which correspond to the names is displayed below each of the names of the commands. Furthermore, symbols 221 to 228 schematically illustrating the type of touch manipulation are displayed in the lower right part of the touch manipulation explanation screen 141, and the explanation of each of the types of the corresponding touch manipulation is displayed to the right side of the symbols.

The schematic diagrams 151 to 197 illustrating the combinations of the type of touch manipulation and the number of fingers basically correspond to the commands for the editing process shown in the manipulation table of touch manipulation illustrated in FIG. 7, respectively. Accordingly, the schematic diagrams 151 to 197 of the touch manipulation are described below, referring to FIG. 7.

The 4 types of the manipulation, a touch manipulation, a hold manipulation, a flick manipulation, and a pinch manipulation are basically employed as the types of the touch manipulation shown in the symbols 221 to 228, and multiple types of the touch manipulation are set by a combination of the corresponding 4 types.

The tap manipulation is the manipulation in which the finger is caused to come into contact with one point on the touch panel and then removes the finger from the one point, for a short time (hit lightly). Furthermore, the double tap manipulation is a manipulation in which the tap manipulation is repeated two times. The hold manipulation is a manipulation in which the finger is caused to come into contact with the touch panel and then to remain stationary. The flick manipulation is a manipulation which gives the touch panel a quick hit (snaps). The pinch manipulation is a manipulation in which the finger is caused to touch on the touch panel, and expands and narrows an interval between the two fingers with the two fingers remaining in touch with the touch panel. Furthermore, in the pinch manipulation, the manipulation which expands the interval between the two fingers is defined as a pinch-out manipulation and the manipulation which narrows the interval between the two fingers is defined as a pinch-in manipulation.

A symbol 221 of the touch manipulation shown as a black circle mark schematically illustrates the hold manipulation in such a manner that the symbol 221 is displayed as "Hold" for explanation.

A symbol 222 of the touch manipulation shown as a double circle mark schematically illustrates the double tap manipulation in such a manner that the symbol 222 is displayed as "Double Tap" for explanation.

A symbol 223 of the touch manipulation shown as a single circle mark schematically illustrates the tap manipulation in such a manner that the symbol 223 is displayed as "Tap" for explanation.

A symbol 224 of the touch manipulation, shown as a double circle mark having a black circle inside, schematically illustrates a combination of the double tap manipulation and the hold manipulation, in such a manner that the symbol 224 is displayed as "Double Tap and Hold" for explanation. The combination of the double tap manipulation and the hold manipulation means the manipulation which causes the touch panel to be held on without the finger in contact with the touch panel being separated from the touch panel, when the second tap manipulation is executed.

A symbol 225 of the touch manipulation shown as a downward arrow schematically illustrates the downward flick manipulation in such a manner that the symbol 222 is displayed as "Flick to Down" for explanation.

A symbol 226 of the touch manipulation shown as an upward arrow schematically illustrates the upward flick manipulation in such a manner that the symbol 226 is displayed as "Flick to Up" for explanation.

A symbol 227 of the touch manipulation shown as a leftward arrow schematically illustrates the leftward flick manipulation in such a manner that the symbol 227 is displayed as "Flick to Left" for explanation.

A symbol 228 of the touch manipulation shown as a rightward arrow schematically illustrates the rightward flick manipulation in such a manner that the symbol 228 is displayed as "Flick to Right" for explanation.

Manipulation Table of Touch Manipulation

FIG. 7 is a view illustrating a manipulation table of touch manipulation.

Because the manipulation table in FIG. 7 has a matrix structure, a set of items in the horizontal direction in FIG. 7 is hereinafter referred to as a "row" and a set of items in the vertical direction in FIG. 7 is hereinafter referred to as a "column". Furthermore, in FIG. 7, the row number is assigned beside the left end of each row for the sake of convenience. Furthermore, the column number is assigned above the upper end of each row for the sake of convenience.

The type of a predetermined touch panel with respect to the touch panel is mapped onto a predetermined row of the manipulation table. The items in each row are described in order of descending from the uppermost position.

A variety of commands, which may be issued by the tap manipulation, are individually described in each item in the first row, described as "Tap".

A variety of command, which may be issued by a combination of the combination of the double tap manipulation and the hold manipulation (that is, the manipulation that causes the touch panel to be held on without the finger in contact with the touch panel being separated from the touch panel when the second tap manipulation is executed) and the jog manipulation, are individually described in each item in the second row, described as "1.5 Tap (Double Tap and Hold+Jog)".

A variety of commands, which may be issued by the double tap manipulation, are individually described in each item in the third row, described as described as "Double Tap".

A variety of commands, which may be issued by the flick manipulation in the horizontal direction, are individually described in each item in the fourth row, described as "Flick (Horizontal)".

A variety of commands, which may be issued by the flick manipulation in the vertical direction, are individually described in each item in the fifth row, described as "Flick (Vertical)".

A variety of commands, which may be issued by the tap manipulation using one finger and the hold manipulation using other fingers, are individually described in each item in the sixth row, described as "Hold and Tap (One finger tap, Other Fingers hold)".

A variety of commands, which may be issued by the hold manipulation using one finger and the tap manipulation using other fingers, are individually described in each item in the seventh row, described as "Hold and Tap (One finger hold, Other Fingers tap)".

A variety of commands, which may be issued by the hold manipulation using one finger and the flick manipulation in the vertical direction using other fingers, are individually described in each item in the eighth row, described as "Hold and Flick (Vertical) (One finger Hold, Other Fingers Flick)".

A variety of commands, which may be issued by the flick manipulation in the vertical direction using one finger and the hold manipulation using other fingers, are individually described in each item in the ninth row, described as "Hold and Flick (Vertical) (One finger Flick, Other Fingers hold)".

A variety of commands, which may be issued by the hold manipulation using two fingers and the flick manipulation in the vertical direction using other fingers, are individually described in each item in the tenth row, described as "Hold and Flick (Vertical) (Two fingers Hold, Other Fingers Flick)".

A variety of commands, which may be issued by the hold manipulation using one finger and the flick manipulation in the horizontal direction using other fingers, are individually described in each item in the eleventh row, described as "Hold and Flick (Horizontal) (One finger Hold, Other Fingers Flick)".

A variety of commands, which may be issued by the flick manipulation in the horizontal direction using one finger and the hold manipulation using other fingers, are individually described in each item in the twelfth row, described as "Hold and Flick (Horizontal) (One finger Flick, Other Fingers hold)".

A variety of instructions, which may be issued by the pinch-in manipulation and the pinch-out manipulation, are individually described in each item in the thirteenth row, described as "Pinch in/out".

The number of fingers that is used in executing the predetermined touch panel with respect to the touch panel is mapped onto the predetermined row of the manipulation table. One to four fingers are employed in terms of the number of fingers that are used in executing the touch manipulation in the manipulation table. Furthermore, in a case where the number of fingers used is two, a predetermined touch manipulation may be set with respect to each of the two fingers, the left finger and the right finger. Furthermore, in a case where the number of fingers used is three, a predetermined touch manipulation may be set with respect to each of the three fingers, the left finger, the center finger, and the right finger. The items in each column are described in order of moving from the leftmost position.

A variety of commands, which may be issued in a case where the editor executes the manipulation in a state that the touch panel is touched using the one finger, are described in each item in the first column, described as "One finger".

A variety of commands, which may be issued in a case where the editor executes the manipulation using the left finger in a state that the touch panel is touched using the two fingers, are described in each item in the second column described as "Two fingers Left".

A variety of commands, which may be issued in a case where the editor executes the manipulation using the right finger in a state that the touch panel is touched using the two fingers, described in each item in the third column, described as "Two fingers Right".

A variety of commands, which may be issued in a case where the editor executes the manipulation using the left finger, in a state that the touch panel is touched using the three fingers, are described in each item in the fourth column, described as "Three fingers Left".

A variety of commands, which may be issued in a case where the editor executes the manipulation using the center finger, in a state that the touch panel is touched using the three fingers, are described in each item in the fifth column, described as "Three fingers Center".

A variety of commands, which may be issued in a case where the editor executes the manipulation using the right finger, with the three fingers kept in touch, are described in each item in the sixth column, described as "Three fingers Right".

A variety of commands, which may be issued in a case where the editor executes the manipulation, in a state that the touch panel is touched using the four fingers, are described in each item in the seventh column, described as "Four fingers".

Furthermore, the touch manipulation described above may adjust, for example, the sensitivity, by setting the parameter, in the touch manipulation setting screen that is displayed in a case where the touch manipulation setting screen selection region 132 is selected in the setting screen in FIG. 5. When the touch manipulation setting screen selection region 132 is selected, the touch manipulation setting screen not illustrated is displayed in the selection screen display region 135. Then, the setting of the parameter is possible as described below.

"Jog sensitivity" is a parameter to set a scale factor of an amount which the timeline in the editing screen moves, with respect to the jog amount in the jog manipulation.

"Jog inertia" is a parameter that sets a rate at which the graduation 111 moving according to the jog manipulation reduces the speed, until the movement is stopped after the jog manipulation is ended.

"Tap time" is a parameter that sets a maximum value of the contact time of the finger with respect to the touch panel as a threshold value of the time for which the tap manipulation is recognized. That is, when the finger is separated from the touch panel within the time which is set as the threshold value, a tap manipulation is recognized.

"A first threshold value of the double tap" is a parameter that sets the maximum value of the time from when the first contact of the finger is released to when the second contact of the finger is started, as a first threshold value of the time for which the double tap manipulation is recognized. That is, after the first contact of the finger is released, a double tap manipulation is recognized when the second contact of the finger is started within the time that is set as the first threshold value.

"A second threshold value of the double tap" is a parameter that sets the maximum value of the time from when the first contact of the finger is started to when the second contact of the finger is released, as a second threshold value of the time for which the double tap manipulation is recognized. That is, after the first contact of the finger is started, a double tap manipulation is recognized when the second contact of the finger is released within the time that is set as the second threshold value.

The "Touch sensitivity of the jog manipulation (the horizontal direction)" is a parameter that sets a minimum distance that the flick manipulation in the horizontal direction moves. That is, when a distance that the finger moves is equal to or less than the distance that is set in the horizontal direction, a flick manipulation is not recognized.

The "touch sensitivity of the jog manipulation (the vertical direction)" is a parameter that sets a minimum distance that the flick manipulation in the vertical direction moves. That is, when the finger moves a distance that is equal to or less than the distance that is set in the vertical direction, a flick manipulation is not recognized.

The editor may adjust the touch manipulation to a desired sensitivity by adjusting a variety of the parameters.

As described above, one predetermined command for the editing process is assigned to the touch manipulation that is specified basically by i row and j column (i is an arbitrary integer value from integer values of 1 to 13 and a j is an arbitrary integer value from integer values of 1 to 7). In this case, the kind of command assigned to each touch manipulation is not particularly limited, but a variety of commands are assigned in the manipulation table illustrated in FIG. 7, in such a manner that the cutting edit in FIGS. 8 to 13 is possible. Therefore, in order to facilitate an understanding of a variety of the commands that are assigned in FIG. 7, the cutting edit is described referring to FIGS. 8 to 13 before the variety of the commands are described.

The cutting edit means a sequence of editing tasks as follows. First, a material, which is used in creating content, is selected as an input material, from among the materials imported into the editing apparatus 12. Then, a predetermined section of the selected input material is selected as a section (hereinafter referred to as a to-use section) that is added to a predetermined material. Then, the selected to-use section is written over or is inserted into a predetermined section (hereinafter referred to as a to-be-used section) of a predetermined material. The output material is created and becomes content, by performing the cutting edit that is a sequence of editing tasks in this way.

FIG. 8 is a view illustrating an example of an editing screen that is displayed on the display apparatus 13.

A material management region 321, an input material check region 322, an output material check region 323 and a timeline region 324 are included in the editing screen 311 illustrated in FIG. 8.

Information showing, for example, a storage position of the material in the editing apparatus 12 is displayed in the material management region 321. Specifically, a tree structure is displayed in such a manner that, for example, the storage position of the material in the editing apparatus 12 is understood, for example, in such a manner that the storage position is displayed using Explorer (registered trademark) of Microsoft. In FIG. 8, only a symbol 331 (hereinafter shortened to the material 331), which shows a predetermined material among multiple materials used in the editing task by the editor, is displayed in the material management region 321.

The material selected from the material management region 321 is displayed for a preview as the input material in the input material check region 322.

The at-editing or post-editing event in the timeline region 324 is displayed for a preview in the output material check region 323.

The timeline is displayed in the timeline region 324. One timeline makes up one piece of content. Multiple tracks are included in the timeline, and 6 timelines are displayed in FIG. 8. The track is categorized into a video track that edits image data, an auto track that edits audio data, a CG track that edits CG data, and others. The editor may perform various edits that involve adding effects, and overlaying a telop, a soundtrack, and others, by layering image data, audio data, CG data, and others using the track. The editor may perform various edits that involve adding a narration to a track and adding BGM (background music) to a separate track, using multiple audio tracks. All of the video tracks, the audio tracks, the CG tracks and others that exist in the timeline are synthesized after various edits like this, and thus make up final content.

The editor reads the material 331, which is the input material, into the input material check region 322, by selecting the material 331 as the input material from the material management region 321 and executing a predetermined touch manipulation using the manipulation input apparatus 11. Then, the editor, as illustrated in FIG. 9, displays the material 331, which is the input material, for a preview, in the input material check region 322.

FIG. 9 is a view illustrating an example in which the material 331, which is the input material, is displayed for a preview.

The editor displays the material 331, which is the input material, for a preview, in the input material check region 322, by executing a predetermined touch manipulation using the manipulation input apparatus 11.

A play line 351, which shows the reproduction position of the preview display of the material 331, which is the input material, is displayed in a play line area 341. That is, the entire section (that is, the length in the horizontal direction) of the play line area 341 is a section that corresponds to the time length of the material 331, which is the input material, and that the play line 351 may operate. Accordingly, the editor may determine the to-use section of the material 331, which is the input material, as illustrated in FIG. 10, referring to the position of the play line 351.

FIG. 10 is a view illustrating an example in which the to-use section of the material 331, which is the input material, is determined.

The editor sets an IN point 361 and an OUT point 362 in the play line area 341 by executing a predetermined touch manipulation using the manipulation input apparatus 11 referring to the position of the play line 351, and determines a section between the IN point 361 and the OUT point 362 as the to-use section 371 of the material 331, which is the input material. Next, the editor determines the position of the beginning of the to-be-used section of the timeline, as illustrated in FIG. 11.

Figure 11:
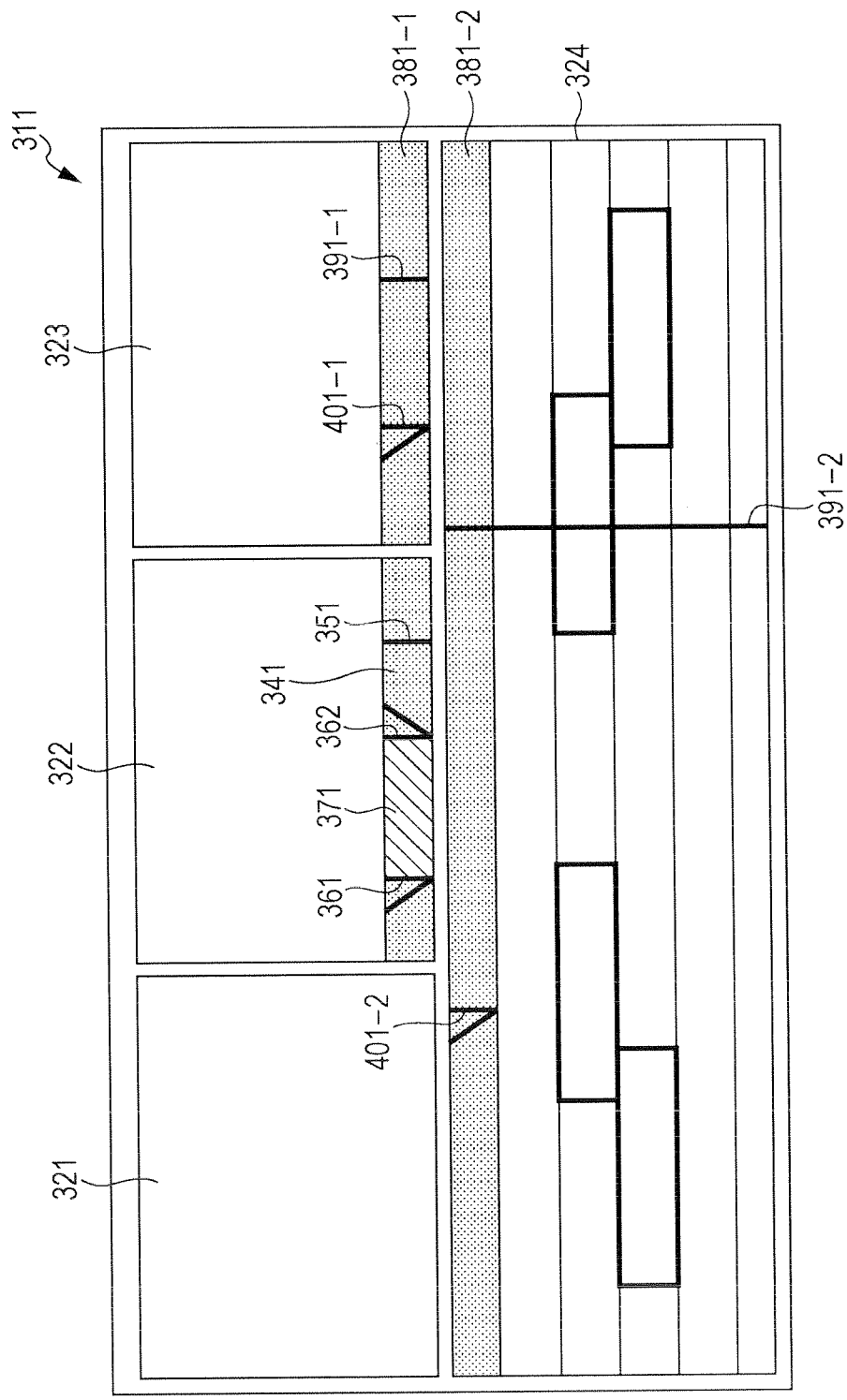
FIG. 11 is a view illustrating an example in which a position of the beginning of a to-be-used section is determined.

FIG. 11 is a view illustrating an example in which the position of the beginning of the to-be-used section of the timeline is determined.

The editor displays the event, which is arranged on the timeline, for a preview, in the output material check region 323, by executing a predetermined touch manipulation using the manipulation input apparatus 11.

The play line 391-2 is displayed in the timeline region 324. A display 391-2 shows the reproduction position of the timeline that is displayed for a preview in the output material check region 323. That is, the events that are positioned on the play line 391-2 are synthesized and are displayed for a preview in the output material check region 323.

Accordingly, the editor determines the position of the beginning of the to-be-used section of the timeline and sets a mark-in point 401-2 in the play line area 381-2, by executing a predetermined touch manipulation using the manipulation input apparatus 11 referring to the position of the play line 391-2. Next, the editor, as illustrated in FIG. 12, arranges the to-use section 371 of the material 331 in the position to which the mark-in point 401-2 of the timeline region 324 is set.

Furthermore, the play line area 381-1 of the output material check region 323 and the play line area 381-2 of the timeline region 324 are different in scale (that is, in relative length with respect to the display screen) from each other, but actually display the same time length. Accordingly, the play line 391-1 and the mark-in point 401-1 that are displayed in the play line area 381-1 of the output material check region 323, and the play line 391-2 and the mark-in point 401-2 that are displayed in the play line area 381-2 of the timeline region 324 show the same point in time of the timeline.

Figure 12:
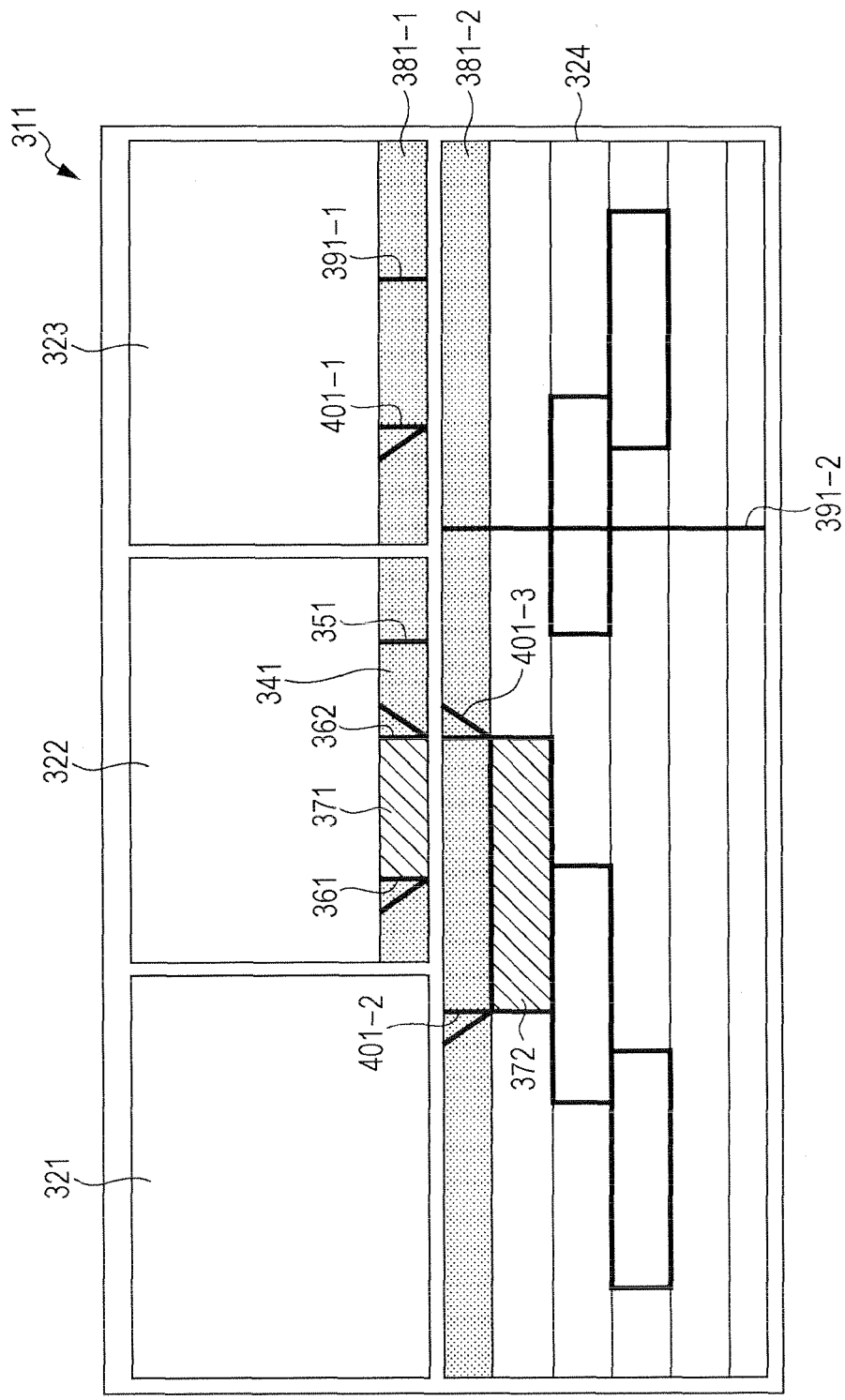
FIG. 12 is a view illustrating an example in which the to-use section is arranged in a timeline.

FIG. 12 is a view illustrating an example in which the to-use section 371 of the material 331 is arranged in the timeline.

The editor cuts out the to-use section 371 of the material 331, which is the input material, and arranges the result as the event 372 in the position that is shown as the mark-in point 401-2 on the timeline in the timeline region 324, by executing a predetermined touch manipulation using the manipulation input apparatus 11.

As a technique that arranges the to-use section 371 of the input material in the timeline, there is a technique that determines three or four points among the IN point and OUT point of the input material, and the mark-in point and the mark-out point on the timeline. Furthermore, the mark-out point shows the position of the end of the to-be-used section, and is shown as the mark-out 401-3 in FIG. 12.

Next, the editor displays the event, which is arranged on the timeline, for a preview, in the output material check region 323, and checks the image of the link between the event 372 and other events, by executing a predetermined touch manipulation using the manipulation input apparatus 11. In a case where the image of the link is unnatural and incomplete, the editor performs a trimming edit that is a fine adjustment of the image of the link. The trimming edit is described referring to FIG. 13.

Figure 13:
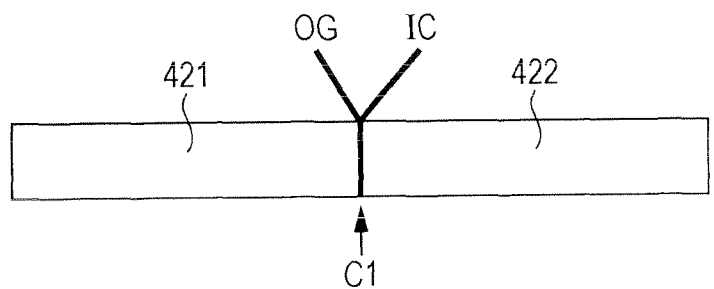
FIG. 13 is a view to describe a trimming edit.

FIG. 13 is a view to describe the trimming edit.

FIG. 13 is a view to describe an A side edit, a B side edit, and an AB side edit, among the trimming edits. As illustrated in FIG. 13, an event 421 and an event 422 are linked to each other, with a cutting point C1.

At this time, the trimming edit, in which only the position of the end of the section of the event 421 which is shown as OG (Out Going) is changed, in the link between the event 421 and the event 422, is referred to as the A side edit. In contrast, the trimming edit, in which only the position of the beginning of the section of the event 422 which is shown as IC (In Coming) is changed, in the link between the event 421 and the event 422, is referred to as the B side edit. Furthermore, the trimming edit, in which both are changed, is referred to as the AB side edit.

As described above, the editor performs the cutting edit and creates content, by executing the predetermined touch manipulation using the manipulation input apparatus 11.

The variety of commands which causes the editing process described above to be possible is shown in the manipulation table in FIG. 7 as described above. Therefore, the variety of commands is described below, while using the editing process described above, as a proper example.

The touch manipulation, which is stipulated in each of the first row and first column, the first row and second column, the first row and third column, the first row and fourth column, the first row and fifth column, the first and sixth column, and the first and seventh column of FIG. 7 (hereinafter shortened to the first row and first to seventh columns), that is, the command issued by the manipulation in the schematic diagram 151 shown in FIG. 6, is "Stop". The "Stop" is a command that stops reproducing the image displayed for a preview in the focus region, in the editing screen 311.

Specifically, when the "Stop" is issued in a case where the focus is set to be on the input material check region 322, the reproduction of the input material displayed for a preview is stopped. On the other hand, when the "Stop" is issued in a case where the focus is set to be on the output material check region 323 or the timeline region 324, the reproduction of the at-editing or post-editing event is stopped.

The touch manipulation in the second row and first column in FIG. 7, that is, the command issued by the manipulation in the schematic diagram 153 in FIG. 6 is "Shuttle". The "Shuttle" is a command that enables a shuttle reproduction of, that is, a speed-changing reproduction of the image that is displayed for a preview in the focus region, in the editing screen 311. At this time, the speed-changing reproduction is executed in such a manner that the larger the jog amount of the jog manipulation in the manipulation region 96, the faster the reproduction speed of the image that is being reproduced in the focus region, is in the editing screen 311.

The touch manipulation in the third row and first column in FIG. 7, that is, the command issued by the manipulation in the schematic diagram 154 in FIG. 6 is "Stop→Play". The "Stop→Play" is a command that stops or starts reproducing the image displayed for a preview in the focus region, in the editing screen 311.

The touch manipulation in the third row and second to third columns in FIG. 7, that is, the commands issued by the manipulation in the schematic diagram 155 in FIG. 6 is "Mark Event". The "Mark Event" is a command that sets the IN point and the OUT point (or the mark-in point and the mark-out point) to the beginning and the end of the event of the process object in the focus region, respectively, at the same time, in the editing screen 311. Specifically, when the "Mark Event" is issued in a case where the focus is set to be on the input material check region 322, the IN point 361 and the OUT point 362 are set to the beginning and the end of the input material which is the process object.

On the other hand, when the "Mark Event" is issued in a case where the focus is set to be on the input material check region 323, the mark-in point 401-1 and the mark-out point are set to the beginning and the end of the at-editing or post-editing event, respectively. Furthermore, when the "Mark Event" is issued in a case where the focus is set to be on the timeline region 324, the mark-in point 401-2 and the mark-out point 401-3 are set to the beginning and the end of the at-editing or post-editing event, respectively.

The touch manipulation in the third row and fourth to sixth columns in FIG. 7, that is, the commands issued by the manipulation in the schematic diagram 156 in FIG. 6 is "Clear mark-in/Out". The "Clear mark-in/Out" is a command that releases the IN point and the OUT point (or the mark-in point and the mark-out point), which are set by the manipulation in the third row and second to third columns, at the same time.

The touch manipulation in the third row and seventh column in FIG. 7, that is, the command issued by the manipulation in the schematic diagram 157 in FIG. 6 is "Focus". The "Focus" is a command that enlargedly displays the material or the timeline that is displayed currently in the focus region, in the editing screen 311. That is, the corresponding command is the same as the command that is mapped onto the pinch-out manipulation corresponding to the display section 112 of the horizontal direction scrub region 97.

The touch command that is stipulated in the fourth row and second to third columns in FIG. 7, that is, the commands issued by the manipulation in the schematic diagrams 160 and 161 in FIG. 6 is "Play Forward/Reverse (1×, 2×, 4×, 8×, 16×, 32×, −1×, −2×, −4×, −8×, −16×, −32×)". The "Play Forward/Reverse (1×, 2×, 4×, 8×, 16×, 32×, −1×, −2×, −4×, 8×, −16×, −32×)" is a command that changes the speed of rewinding and at the same time reproducing at a constant speed or the speed of forwarding and at the same time reproducing at a constant speed the image that is displayed for a preview in the focus region, in the editing screen 311.

Specifically, since the "Play (1×)", "Play (2×)", "Play (4×)", "Play (8×)" and so forth are sequentially issued whenever the flick manipulation is performed using the left finger of the two fingers, the speed of rewinding and at the same time reproducing the image that is displayed for a preview becomes accordingly higher one time, two times, four times, eight times, and so forth. That is, according to an increase in the number of times of the flick manipulation using the left finger of the two fingers, the speed of rewinding and at the same time reproducing the image that is displayed for a preview becomes higher. On the other hand, since the "Play (−1×)", "Play (−2×)", "Play (−4×)", "Play (−8×)" and so forth are sequentially issued whenever the flick manipulation is performed using the right finger of the two fingers, the speed of forwarding and at the same time reproducing the image that is displayed for a preview becomes accordingly higher one time, two times, four times, eight times, and so forth. That is, according to an increase in the number of times of the flick manipulation using the right finger of the two fingers, the speed of forwarding and at the same time reproducing the image that is displayed for a preview becomes higher.

The touch manipulation in the fourth row and fourth to sixth columns in FIG. 7, that is, the command issued by the manipulation in the schematic diagrams 162 and 163 in FIG. 6 is "SV (To left) MV (To right)". The "SV (To left) MV (To right)" is a command that changes the region on which the focus is set to any one of the input material check region 322 and the output material check region 323 in the editing screen 311. Specifically, since the "SV (To left)" is issued in a case where the flick manipulation is executed in the left direction using the three fingers, the focus is set to be on the input material check region 322. On the other hand, since the "MV (To right)" is issued in a case where the flick manipulation is executed in the right direction using the three fingers, the focus is set to be on the output material check region 323.

The touch manipulation in the fourth row and seventh column in FIG. 7, that is, the command issued by the manipulation in the schematic diagrams 164 and 165 in FIG. 6 is "Undo (To left) Redo (To right)". The "Undo (To left) (To right)" is a command that cancels (that is, Undo) the editing detail, or re-executes (that is, Redo) the editing task. Specifically, since the "Undo (To left)" is issued in a case where the flick manipulation is executed in the left direction using the four fingers, the previous editing detail is canceled (that is, Undo). On the other hand, since the "Redo (To right)" is issued in a case where the flick manipulation is executed in the right direction using the four fingers, the previous editing task is resumed (that is, Redo).

The touch manipulation in the fifth row and second to third columns in FIG. 7, that is, the command issued by the manipulation in the schematic diagrams 166 and 168 in FIG. 6 is "Splice-in (To Down) Extract: (To Up)". The "Splice-in (To Down) Extract (To Up)" is a command that inserts and removes a predetermined section of the input material set by the editor into and from a predetermined position of the timeline region 324, in the play line area 341 of the input material check region 322.

Specifically, since the "Splice-in: (To Down)" is issued in a case where the flick manipulation is executed in the downward direction using the two fingers, the predetermined section of the input material is inserted into the predetermined position in the timeline region 324. On the other hand, since the "Extract: (To Up) is issued in a case where the flick manipulation is executed in the upward direction using the two fingers, the predetermined section of the input material inserted into the predetermined position in the timeline region 324 is removed.

Furthermore, the predetermined section of the input material may be, for example, a section that the editor arbitrarily selects, such as the to-use section 371, a section from the IN point 361 to the last frame of the input material, and a section from the head frame of the input material to the OUT point 362. Furthermore, in a case where a predetermined section of the input material is inserted into a predetermined position in the timeline region 324, the event, which is arranged after a predetermined position in the corresponding timeline region 324, is shifted backwards by the predetermined section of the inserted input material. Furthermore, in a case where the predetermined section of the input material is removed from the predetermined position in the timeline region 324, the event, which is arranged after the predetermined position in the corresponding timeline region 324, is shifted forwards by the predetermined section of the removed input material.

The touch manipulation in the fifth row and fourth to sixth columns in FIG. 7, that is, the command issued by the manipulation in the schematic diagrams 167 and 169 in FIG. 6 is "Overwrite: (To Down) Lift: (To Up)". The "Overwrite: (To Down) Lift: (To Up)" is a command that superimposes a predetermined section of the input material that is set by the editor on a predetermined position in the timeline region 324 or releases the superposition, in the play line area 341 of the input material check region 322.

Specifically, since the "Overwrite: (To Down)" is issued in a case where the flick manipulation is executed in the downward direction using the three fingers, the predetermined section of the input material is superimposed in the predetermined position in the timeline region 324. At this point, the superposition does not mean that the material is synthesized and is equivalent to the material being overwritten. However, since the return to the pre-overwriting state is not possible in a case of overwriting, the term superposition is used to mean that return to the original state is possible. That is, the release of the superimposition means that the material returns to its previous state prior to the superimposition. On the other hand, since the "Lift: (To Up)" is issued in a case where the flick manipulation is executed in the upward direction using the two fingers, the superposition is released and the return to the original material occurs, with respect to the predetermined section of the input material superimposed in the predetermined position in the timeline region 324.

Furthermore, a predetermined section of the input material, as described above, may be arbitrarily selected by the editor. Furthermore, in a case where the predetermined section of the input material is written over the predetermined position in the timeline region 324, a position of the event does not change, which is arranged after the predetermined position in the corresponding timeline region 324. Likewise, in a case where the superposition of the predetermined section of the input material in the predetermined position in the timeline region 324 is released, a position of the event does not change, which is arranged after the predetermined position in the corresponding timeline region 324.

The touch manipulation in the fifth row and seventh column in FIG. 7, that is, the command issued by the manipulation in the schematic diagrams 170 and 171 in FIG. 6 is the "Paste: (to Down) Cut (to Up)". "Paste: (to Down) Cut (to Up)" is a command that enables a process (that is, a paste process) of pasting a predetermined section of the event arranged in the timeline region 324 of the editing screen 311, or a process (a tear-off process) of cutting the predetermined section of the event arranged in the timeline region 324 of the editing screen 311. Specifically, since the "Paste: (to Down)" is issued in a case where the flick manipulation is executed in the downward direction using the four fingers, the paste process is performed on the predetermined section of the event arranged in the timeline region 324. On the other hand, since the "Cut (to Up)" is issued in a case where the flick manipulation is executed in the upward direction using the four fingers, the tear-off process is performed on the predetermined section of the event arranged in the timeline region 324.

The touch manipulation in the sixth row and second column in FIG. 7, that is, the command issued by the manipulation in the schematic diagram 172 in FIG. 6 is "one frame backwards (Tap left)". The "One frame backwards (Tap left)" is a command that rewinds by one frame the image that is displayed for a preview in the focus region, in the editing screen 311. Specifically, since the "one frame backward (Tap left)" is issued in a case where the tap manipulation is executed using the left finger of the two fingers, the image displayed for a preview is rewound by one frame.

The touch manipulation in the sixth row and third column in FIG. 7, that is, the command issued by the manipulation in the schematic diagram 173 in FIG. 6 is "one frame forward (Tap right)". The "One frame forward (Tap right)" is a command that fast forwards by one frame the image that is displayed for a preview in the focus region, in the editing screen 311. Specifically, since "one frame forward (Tap right) is issued in a case where the tap manipulation is executed using the right finger of the two fingers, the image displayed for a preview is fast forwarded by one frame.

The touch manipulation in the sixth row and fourth column in FIG. 7, that is, the command issued by the manipulation in the schematic diagram 174 in FIG. 6 is "PREV EVENT (Tap one left)". The "PREV EVENT (Tap one left)" is a command that changes the image displayed for a preview in the focus region to the image coming from the head of the event that is one event back, in the editing screen 311. Specifically, since the "PREV EVENT (Tap one left)" is issued in a case where the tap manipulation is executed using the left finger of the three fingers, the image displayed for a preview is changed to the image coming from the head of the event that is one event ahead.

The touch manipulation in the sixth row and sixth column in FIG. 7, that is, the command issued by the manipulation in the schematic diagram 175 in FIG. 6 is "NEXT EVENT (Tap one right)". The "NEXT EVENT (Tap one right)" is a command that changes the image displayed for a preview in the focus region to the image coming from the head of the event that is one event ahead, in the editing screen 311.

Specifically, in a case where the tap manipulation is executed using the right finger of the three fingers, the image displayed for a preview is changed to the image coming from the head of the event that is one event back.

The touch manipulation in the seventh row and fourth column in FIG. 7, that is, the command issued by the manipulation in the schematic diagram 177 in FIG. 6 is "Ten frames backward (Tap two left)". The "Ten frames backward (Tap two left)" is a command that rewinds by ten frames the image displayed for a preview in the focus region, in the editing screen 311. Specifically, since the "Ten frames backward (Tap two left)" is issued in a case where the tap manipulation is executed using the left finger and the center finger among the three fingers, the image displayed for a preview is rewound by ten frames.

The touch manipulation in the seventh row and sixth column in FIG. 7, that is, the command issued by the manipulation in the schematic diagram 178 in FIG. 6 is "ten frames forward (Tap two right)". The "Ten frames forward (Tap two right)" is a command that fast forwards by ten frames the image displayed for a preview in the focus region, in the editing screen 311. Specifically, because the "Ten frames forward (Tap two right)" is issued in a case where the tap manipulation is executed using the center finger and the right finger among the three fingers, the image displayed for a preview is fast forwarded by ten frames.

The touch manipulation in the eighth to ninth rows and second column in FIG. 7, that is, the command issued by the manipulation in the schematic diagrams 179 and 180 in FIG. 6 is "Mark-in (To Down) Clear In (To Up)". The "Mark-in (To Down) Clear In (To Up)" is a command that sets or releases the IN point (or the mark-in point) to and from the play line area in the focus region, in the editing screen 311. Specifically, in a case where the flick manipulation is executed in the downward direction using the left finger of the two fingers, the IN point is set because "Mark-in (To Down)" is issued. On the other hand, since the "Clear In (To Up)" is issued in a case where the flick manipulation is executed in the upward direction using the left finger of the two fingers, the setting of the IN point is released.

Furthermore, in a case where the focus is set to be on the input material check region 322, the IN point 361 on the play line area 344 is set or released. On the other hand, in a case where the focus is set to be on the output material check region 323, the mark-in point 401-1 on the play line area 381-1 is set or released. Furthermore, in a case where the focus is set to be on the output material check region 324, the mark-in point 401-2 on the play line area 381-2 is set or released.

The touch manipulation in the eighth to ninth rows and third column in FIG. 7, that is, the command issued by the manipulation in the schematic diagrams 181 and 182 in FIG. 6 is "Mark-out (To Down) Clear Out (To Up)". The "Mark-out (To Down) Clear Out (To Up)" is a command that sets or releases the OUT point (or the mark-out point) to and from the play line area in the focus region, in the editing screen 311. Specifically, since the "Mark-out (To Down)" is issued in a case where the flick manipulation is executed in the downward direction using the right finger among the two fingers, the OUT point is set. On the other hand, since the "Clear Out (To Up)" is issued in a case where the flick manipulation is executed in the upward direction using the right finger among the two fingers, the setting of the OUT point is released.

Furthermore, the OUT point 362 on the play line area 344 is set or released in a case where the focus is set to be on the input material check region 322. On the other hand, in a case where the focus is set to be on the output material check region 323, the mark-out point on the play line area 381-1 is set or released. Furthermore, in a case where the focus is set to be on the output material check region 324, the mark-out point 401-3 on the play line area 381-2 is set or released.

The touch manipulation in the eighth row and fourth column in FIG. 7, that is, the command issued by the manipulation in the schematic diagram 183 in FIG. 6 is the "Extract from the head of the event to current (Flick Up two left)". "Extract from the head of the event to current (Flick Up two left)" is a command that removes a section from the head frame of a predetermined event arranged in the timeline region 324 in the editing screen 311 to the position of the current play line 391-2.

Specifically, since the "Extract from the head of the event to current (Flick Up two left)" is issued in a case where the flick manipulation is executed in the upward direction using the left finger and the center finger among the three fingers, the section from the head frame of the predetermined event to the position of the current play line 391-2 is removed. Furthermore, in a case where the corresponding section is removed, the event which is arranged after the corresponding section is shifted forwards by the corresponding section.

The touch manipulation in the eighth row and sixth column in FIG. 7, that is, the command issued by the manipulation in the schematic diagram 184 in FIG. 6 is "Extract from current to the end of the event (Flick Up two right)". "Extract from the head of the event to current (Flick Up two right)" is a command that removes a section from the current position of the play line 391-2 of the predetermined event arranged in the timeline region 324 in the editing screen 311 to the frame of the end of the corresponding event.

Specifically, since "Extract from current to the end of the event (Flick Up two right)" is issued in a case where the flick manipulation is executed in the upward direction using the center finger and the right finger among the three fingers, the section from the current position of the play line 391-2 of the predetermined event to the frame of the end of the corresponding event is removed. Furthermore, in a case where the corresponding section is removed, the event that is arranged after the corresponding section is shifted forwards by the corresponding section.

The touch manipulation in the ninth row and fifth column in FIG. 7, that is, the command issued by the manipulation in the schematic diagram 187 in FIG. 6 is "Add Edit (Flick Down center)". The "Add Edit (Flick Down center)" is a command that sets the cutting point to a predetermined event arranged in the timeline region 324 in the editing screen 311. Specifically, in a case where the flick manipulation is executed in the downward direction using the center finger among the three fingers, the cutting point is set to a predetermined event because the "Add Edit (Flick Down center)" is issued.

The touch manipulation in the tenth row and fourth column in FIG. 7, that is, the command issued by the manipulation in the schematic diagram 185 in FIG. 6 is "Lift from the head of the event to current (Flick Up one left)". The "Lift from the head of the event to current (Flick Up one left)" is a command that releases the superposition with respect to the section from the head of the frame of the predetermined event arranged in the timeline region 324 in the editing screen 311 to the current position of the play line 391-2.

Specifically, in a case where the flick manipulation is executed in the upward direction using the left finger among the three fingers, the "Lift from the head of the event to current (Flick Up one left)" is issued and the superposition is released with respect to the section from the head frame of the predetermined event to the current position of the current play line 391-2. Furthermore, in a case where the superposition is released with respect to the corresponding section, the position of the event which is arranged after the corresponding section does not change.

The touch manipulation in the tenth row and sixth column in FIG. 7, that is, the command issued by the manipulation in the schematic diagram 186 in FIG. 6 is "Lift from current to the end of the event (Flick Up one right)". The "Lift from current to the end of the event (Flick Up one right)" is a command that releases the superposition with respect to the section from the current position of the play line 391-2 of the predetermined event arranged in the timeline region 324 in the editing screen 311 to the frame of the end of the corresponding event. Specifically, since the "Lift from current to the end of the event (Flick Up one right)" is issued, in a case where the flick manipulation is executed in the upward direction using the right finger among the three fingers, the superposition is released with respect to the event from the current position of the play line 391-2 of the predetermined event to the frame of the end of the corresponding event. Furthermore, in a case where the superposition is released with respect to the corresponding section, a position of the event which is arranged after the corresponding section does not change.

The touch manipulation in the eleventh to twelfth rows and second to third columns in FIG. 7, that is, the command issued by the manipulation in the schematic diagrams 188 and 189 in FIG. 6 is "Go to In Go to Out". The "Go to In Go to Out" is a command that moves the reproduction position of the focus region to the IN point on the play line area or the OUT point (or the mark-in point or the mark-out point), in the edit image plane 311. Specifically, since the "Go to In" is issued in a case where the flick manipulation is executed in the left direction using one finger among the two fingers, the reproduction position of the image is moved to the IN point (or the mark-in point). On the one hand, since the "Go to Out" is issued, in a case where the flick manipulation is executed in the right direction using one finger among the two fingers, the reproduction position of the image is moved to the OUT point (or the mark-out point).

Furthermore, in a case where the focus is set to be on the input material check region 322, the reproduction position of the image is moved to the IN point 361 or the OUT point 362 on the play line area 344. On the other hand, in a case where the focus is set to be on the output material check region 323, the reproduction position of the image is moved to the mark-in point 401-1 or the mark-out point on the play line area 381-1. Furthermore, in a case where the focus is set to be on the output material check region 324, the reproduction position of the image is moved to the mark-in point 401-2 or the mark-out point 401-3 on the play line area 381-2.

The touch manipulation in the twelfth row and fourth to sixth columns in FIG. 7, that is, the command issued by the manipulation in the schematic diagrams 190 and 191 in FIG. 6 is "Home (To left) End (To right)". The "Home (To left) End (To right)" is a command that moves the reproduction position of the image of the focus region to the head or the end of the play line area, in the editing screen 311. Specifically, since the "Home (To left)" is issued in a case where the flick manipulation is executed in the left direction using the left finger among the three fingers, the reproduction position of the image of the focus region is moved to the head of the play line area. On the other hand, since "End (To right)" is issued in a case where the flick manipulation is executed in the right direction using the left finger among the three fingers, the reproduction position of the image of the focus region is moved to the head of the play line area.

Furthermore, in a case where the focus is set to be on the input material check region 322, the reproduction position of the image is moved to the head of the play line area 344. On the other hand, in a case where the focus is set to be on the output material check region 323, the reproduction position of the image is moved to the head of the play line area 381-1. Furthermore, in a case where the focus is set to be on the timeline region 324, the reproduction position of the image is moved to the head of the play line area 381-2.

The touch manipulation in the twelfth row and seventh column in FIG. 7, that is, the command issued by the manipulation in the schematic diagrams 192 and 193 in FIG. 6 is "Fwd 1.5 (to left) Rev 1.5 (to right)". The "Fwd 1.5 (to left) Rev 1.5 (to right)" is a command that rewinds and at the same time reproduce or fast forwards and at the same time reproduces the image displayed for a preview in the focus region at one and half times speed, in the editing screen 311. Specifically, since the "Fwd 1.5 (to left)" is issued in a case where the flick manipulation is executed in the left direction using the left finger among the four fingers, the image displayed for a preview is rewound at one and half times speed. On the other hand, since the "Rev 1.5 (to right)" is issued in a case where the flick manipulation is executed in the right direction using the right finger among the four fingers, the image displayed for a preview is fast forwarded at one and half times speed.

The touch manipulation in the thirteenth row and second to third columns in FIG. 7, that is, the command issued by the manipulation in the schematic diagrams 194 to 197 in FIG. 6 is "Zoom In/Out (horizontal) Zoom track height (vertical)". The "Zoom In/Out (horizontal) Zoom track height (vertical)" enlargedly displays the material or the timeline of the focus region.

Specifically, since the "Zoom In/Out (horizontal) is issued, in a case where the pinch-in manipulation is executed in the horizontal direction using the two fingers, the material or the timeline of the focus region is enlarged or reduced in the horizontal direction and is displayed. Specifically, since the "Zoom track height (horizontal) is issued, in a case where the pinch-in manipulation is executed in the horizontal direction using the two fingers, the material or the timeline of the focus region is enlarged or reduced in the horizontal direction and is displayed. That is, the direction stipulated in the thirteenth row and second to third columns is the same as the direction mapped onto the manipulation with respect to the horizontal direction scrub region 97 of the manipulation screen 71 in FIG. 4, or the vertical direction display adjustment region 98.

At this point, the schematic diagrams 158 and 159 in FIG. 6, which are mapped onto the directions not shown in the editing table in FIG. 7, are described.

As illustrated in FIG. 6, the name of the command that is mapped onto the schematic diagram 158 is "Jog Forward". At this point, the flick manipulation in the right direction using one finger is shown in the schematic diagram 158, but the "Jog Forward" is also issued by the jog manipulation in the right direction using one finger, as well as, or instead of the manipulation illustrated in the schematic diagram 158. In a case where the "Jog Forward" is issued by the jog manipulation, the reproduction position of the material reproduced in the focus region progresses in proportion to the jog amount.

Furthermore, the name of the command that is mapped onto the schematic diagram 159 is "Jog Reverse". At this point, the flick manipulation in the left direction using one finger is shown in the schematic diagram 159, but the "Jog Reverse" is also issued by the jog manipulation in the left direction using one finger, as well as, or instead of the manipulation illustrated in the schematic diagram 159. In a case where the "Jog Reverse" is issued by the jog manipulation, the reproduction position of the material reproduced in the focus region goes back in proportion to the jog amount.

Next, the manipulation for the trimming edit not shown in the touch manipulation explanation screen 141 in FIG. 6 and the manipulation table in FIG. 7 is described. In a case where the trimming edit is performed, the editor selects "Trim Mode" from the list shown in the list display region 93 in the manipulation screen 71, changes the editing mode to the trimming edit, and then performs a predetermined touch manipulation using the two fingers.

As described referring to FIG. 13, the manipulation, which is mapped onto the command for the A side edit in which only the position of the end of the section of the event 421 shown in OG, in the link between the event 421 and the event 422 is changed, is the hold manipulation using one finger and the manipulation using other fingers. Specifically, the position of the end of the section of the event 421 moves in the left and right directions, corresponding to the jog manipulation in the left and right directions using the finger that is to the side of the event 421, that is, the left finger among the two fingers. At this time, the hold manipulation is executed using the finger that is to the side of the event 422, that is, the right finger among the two fingers.

In contrast, the manipulation, which is mapped onto the command for the B side edit in which only the position of the beginning of the section of the event 422 shown in IC, in the link between the event 421 and the event 422 is changed, is the hold manipulation, opposite to the case of the A side edit. Specifically, the position of the beginning of the section of the event 422 moves in the left and right directions, corresponding to the jog manipulation in the left and right directions using the finger that is to the side of the event 422, that is, the right finger among the two fingers. At this time, the hold manipulation is executed using the finger that is to the side of the event 421, that is, the left finger among the two fingers.

Furthermore, the manipulation, which is mapped onto the command for the AB side edit in which both of the end of the section of the event 421 and the beginning of the section of the event 422, is the jog manipulation using one finger. Specifically, both of the end of the section of the event 421 and the beginning of the section of the event 422 move in the left and right directions, corresponding to the jog manipulation in the left and right directions using the one finger.

Display Example of Manipulation Screen

Figure 14:
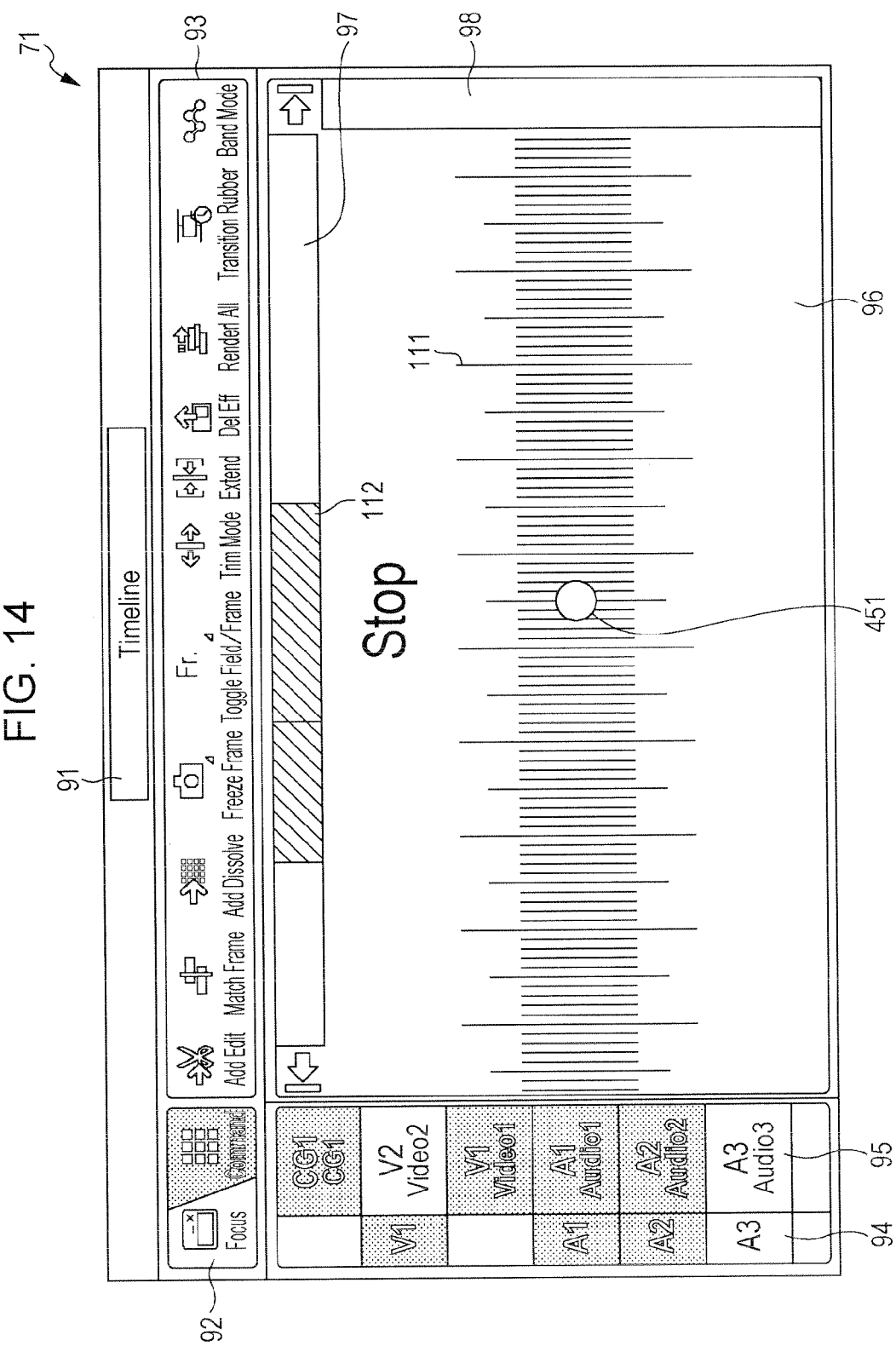
FIG. 14 is a view illustrating a display example of a manipulation screen in a case where the manipulation mapped onto the command in the first row and first column of a manipulation table is executed.
Figure 15:
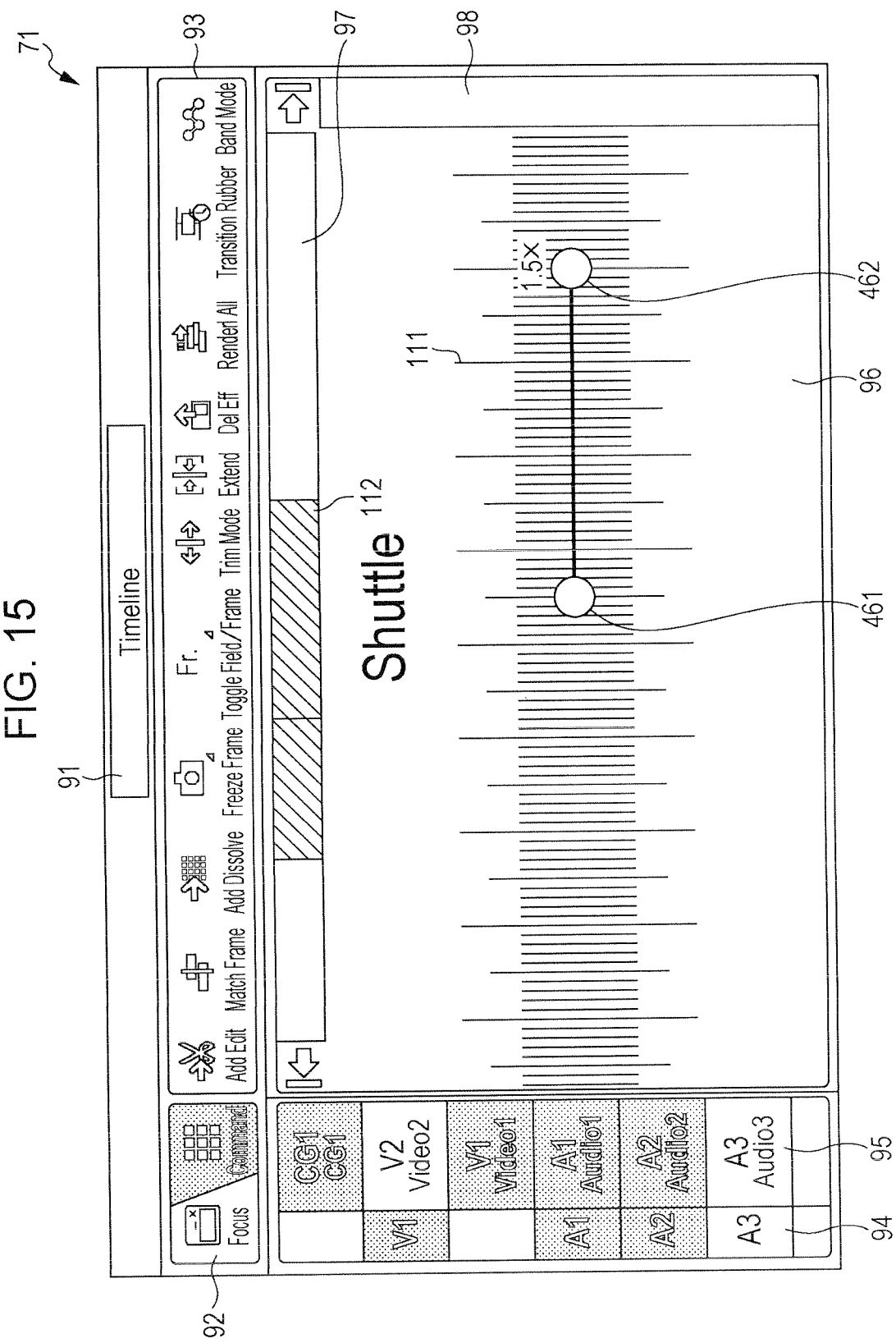
FIG. 15 is a view illustrating a display example of the manipulation screen in a case where the manipulation mapped onto the command in the second row and first column of the manipulation table is executed.
Figure 16:
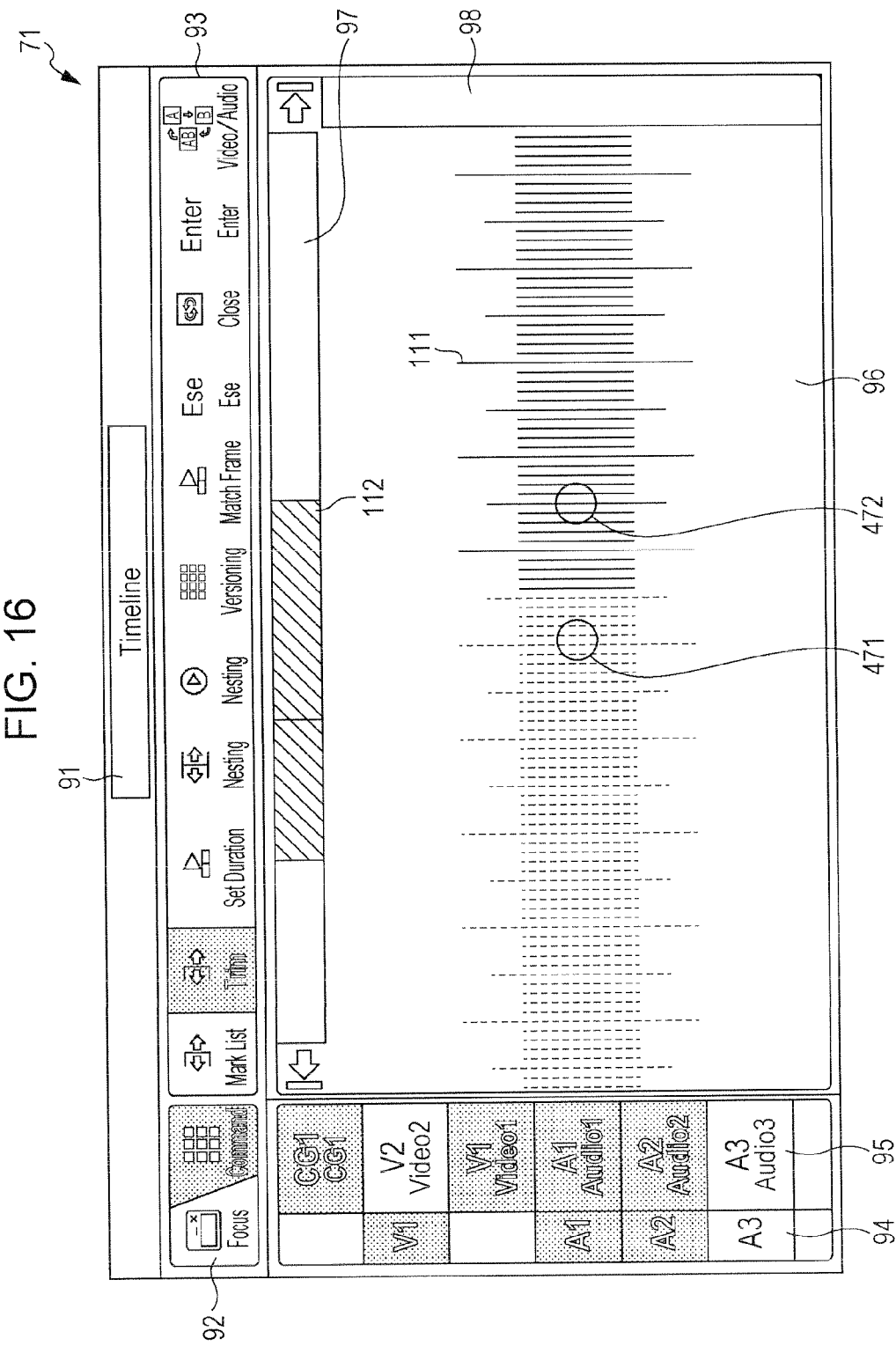
FIG. 16 is a view illustrating a display example of the manipulation screen in a case where the manipulation mapped onto the command for an A side edit in the trimming edit is executed.

Next, a display example of the manipulation screen 71 in a case where the touch manipulation is performed with respect to the manipulation region 96 is described referring to FIGS. 14 to 16.

FIG. 14 is a view illustrating the display example of the manipulation screen 71 in a case where the manipulation mapped onto the command in the first row and first column of the manipulation table is executed.

As illustrated in FIG. 14, in a case where the manipulation to issue the command in the first row and first column of the manipulation table, that is, the tap manipulation using one finger is executed, the region 451 within the manipulation region 96 where the tap manipulation is detected emits light with a predetermined color. Additionally, at this time, the name of the command issued by the corresponding manipulation, that is, the "Stop" in the first row and first column of the manipulation table is displayed over the region 451. On the other hand, the reproduction of the image displayed for a preview in the focus region is stopped by the corresponding manipulation, in the editing screen 311. The editor may check the details of the command for the editing process through the touch manipulation performed by the editor, by visually recognizing the name of the command displayed on the manipulation screen 71.

FIG. 15 is a view illustrating the display example of the manipulation screen 71 in a case where the manipulation mapped onto the command in the second row and first column of the manipulation table is executed.

As illustrated in FIG. 15, in a case where the manipulation to issue the command (FIG. 7) in the second row and first column of the manipulation table, that is, the jog manipulation that follows the second double touch manipulation using one finger is executed, the region within the manipulation region 96, where the tap manipulation is detected, emits light with a predetermined color. That the region 461, where the first jog manipulation is detected, emits light, the region, which is positioned on the track on which the manipulation is executed in the right direction thereafter, emits light, and additionally, the region 462 of the end of the manipulation emits light. That is, the region 461 and the region 462, and the region of a line segment connecting between the region 461 and the region 462 emit light. Additionally, at this time, the name of the command issued by the corresponding manipulation, that is, the "Shuttle" in the second row and first column of the manipulation table is displayed over the region 461. Furthermore, the reproduction speed of "1.5×" is displayed over the region 462.

On the other hand, the reproduction of the image displayed for a preview in the focus region is reproduced at the changing speed, in the editing screen 311. At this time, the reproduction speed of the image displayed for a preview in the focus region changes according to the jog amount that occurs from the region 461 to the region 462, and the reproduction is executed at one and half times speed in the example in FIG. 15.

FIG. 16 is a view illustrating the display example of the manipulation screen 71 in a case where the manipulation mapped onto the command for the A side edit in the trimming edit is executed. In the manipulation screen 71 illustrated in FIG. 16, the "Trim Mode" is selected from the list displayed in the list display region 93, and the manipulation screen 71 is in a state of being changed to the trimming editing mode.

As illustrated in FIG. 16, the left region 471 and the right region 472 emit light in the positions where the touch manipulation using the two fingers is detected, respectively. Then, in the link between the predetermined two events, in order to change the position of the end of the section of the event arranged to the left side, the left region 471 moves corresponding to the jog manipulation in the left and right directions using the left finger. In contrast, because the section of the event arranged to the right side does not change in position, the right region 472 does not move corresponding to the hold manipulation using the right finger.

Manipulation Input Process

Next, the manipulation input process using the manipulation input apparatus 11 described above is described.

Figure 17:
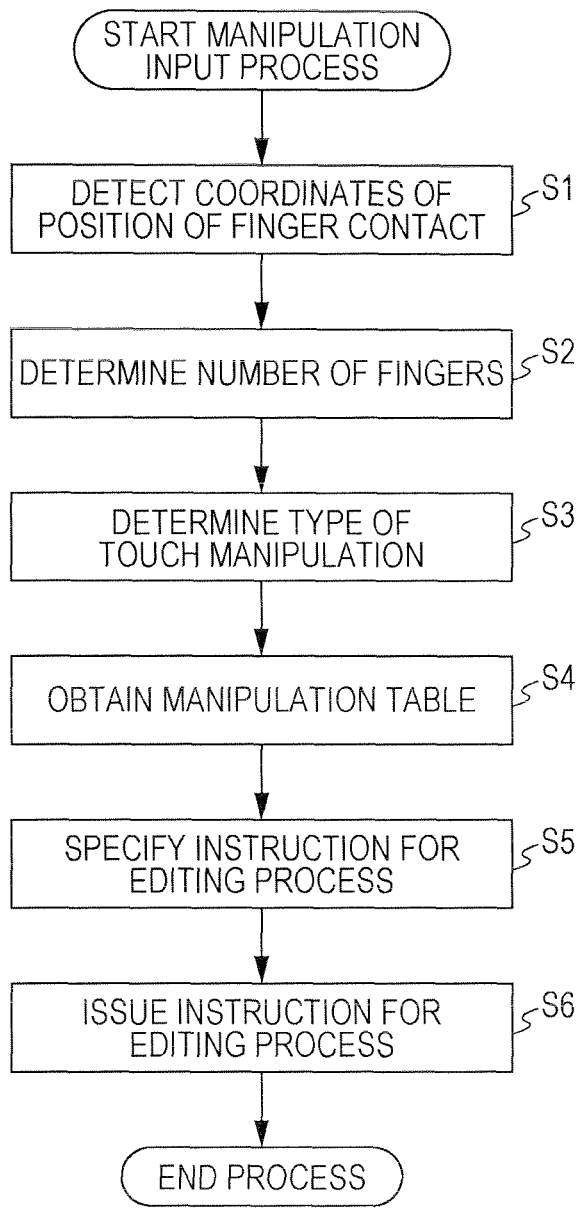
FIG. 17 is a flowchart to describe a flow of a manipulation input process.

FIG. 17 is a flowchart to describe a flow of the manipulation input process.

In Step S1, the contact detection unit 51 detects coordinates of the position at which the finger comes into contact with the touch panel.

In Step S2, the finger number determination unit 52 determines the number of fingers that come into contact with the touch panel, based on the detection result obtained by the contact detection unit 51. That is, the finger number determination unit 52 determines how many fingers come into contact with the touch panel, among the fingers mapped onto a predetermined column of the manipulation table in FIG. 7.

In Step S3, the touch manipulation type determination unit 53 determines the type of touch manipulation of the touch panel, based on the detection result obtained by the contact detection unit 51. That is, the touch manipulation type determination unit 53 determines what type the touch manipulation of the touch panel corresponds to, among the touch manipulations mapped onto a predetermined row of the manipulation table in FIG. 7.

In Step S4, the manipulation table obtainment unit 54 obtains the manipulation table of the touch manipulation stored in the storage unit 28.

In Step S5, the command specification unit 55 recognizes a combination of the number of fingers and the type of touch manipulation, based on the determination results (the process results in Steps S2 and S3) obtained by the finger number determination unit 52 and the touch manipulation type determination unit 53. Then, the command specification unit 55 specifies the command for the editing process, from in the manipulation table obtained by the manipulation catalog obtainment unit 54. That is, the command specification unit 55 specifies what command the touch manipulation of the touch panel corresponds to, among the commands for the editing process, to each of which one i row and j column is basically assigned, in the manipulation table in FIG. 7.

In Step S6, the command issuing unit 56 issues the command for the editing process, specified by the command specification unit 55, to the editing apparatus 12.

As a result, the manipulation input process ends.

In this way, the editing manipulation using the manipulation input apparatus 11 is the intuitive manipulation with respect to the touch panel. The editor may perform the editing task with an intuitive manipulation by using the manipulation input apparatus 11 like this. Furthermore, the editor may suppress the visual check of the manipulation screen 71 of the manipulation input apparatus 11 to the necessary lowest limit while performing the editing task. As a result, the editor may efficiently perform the editing task.

Application of Present Technology to Program

The sequence of processes described above may be performed using hardware, and may be performed using software. In a case where the sequence of processes is performed using software, a program including the software is installed in the computer. At this point, the computer may include a computer incorporated into dedicated hardware, a general-purpose personal computer in which a variety of programs is installed and thus a variety of functions is performed, or the like.

For example, in the manipulation input apparatus 11 in FIG. 2, which is one example of the computer, the CPU 21 operates to load, for example, a program stored in the storage unit 28 onto the RAM 23 via the input and output interface 25 and the bus 24, to execute the program, and thus the sequence of processes described above is performed.

The program that the computer executes may be stored on a removable medium 21 such as a package medium and may be provided. Furthermore, the program may be provided over a wired or wireless transmission medium, such as a local area network, the Internet, and digital satellite broadcasting.

In the computer, the program may be installed in the storage unit 28 via the input and output interface 25, by the removable media 21 being mounted on the drive 30. Furthermore, the program may be received by communication unit 29 over a wired or wireless transmission medium, and may be installed in the storage unit 28. Additionally, the program may be installed in advance in the ROM 22 and the storage unit 28.

Furthermore, the program that the computer performs may be a program by which the process is performed in a time sequence according to the order described in the present specification, and may be a program by which the process is performed in parallel, or at the timing of necessity such as when a call is performed.

The embodiment of the present technology is not limited to the embodiment described above, and a variety of modifications may be made within the scope deviating from the gist of the present technology.

For example, the present technology may include a configuration, such as cloud computing, in which one function is shared by multiple apparatuses over a network, and is jointly processed.

Furthermore, each step described above referring to the flowchart may be performed with one apparatus, and furthermore may be shared by multiple apparatuses and thus may be performed.

In addition, in a case where multiple processes is included in one step, the multiple processes included in the one step may be performed with one apparatuses, and or may be shared by the multiple apparatus and may be performed.

Furthermore, the present technology may include configurations as follows.

(1) An information processing apparatus includes a contact detection unit that detects coordinates of a position of touch manipulation with respect to a touch panel, a storage unit that stores a table that is a command table relating to an editing process with respect to a material that is an element of content, and that at least includes a command to change a reproduction position of the material that is reproduced on a separate information processing apparatus, according to a distance that the touch manipulation moves, and a command specification unit that specifies the command issued to the separate information processing apparatus, from the table stored in the storage unit, based on a detection result obtained by the contact detection unit.

(2) The information processing apparatus according to (1) further includes a finger number determination unit that determines the number of fingers used in the touch manipulation, based on the detection result obtained by the contact detection unit, and a touch manipulation type determination unit that determines a type of touch manipulation, based on the detection result obtained by the contact detection unit. The table includes the command mapped onto a predetermined combination of the number of fingers and the type of touch manipulation, and the command specification unit recognizes the combination of the number of fingers and the type of touch manipulation, based on a determination result obtained by each of the finger number determination unit and the touch manipulation type determination unit, and specifies the command corresponding to the recognized combination, from the table stored in the storage unit.

(3) The information processing apparatus according to (1) or (2) further includes a command issuing unit that issues the command specified by the command specification unit to the separate information processing apparatus.

(4) The information processing apparatus described in any one of (1) to (3) further includes a sensitivity adjustment unit that adjusts a sensitivity of the touch manipulation.

(5) The information processing apparatus according to any one of (1) to (4) further includes a display unit that displays a predetermined image, and a display control unit that performs control to cause the display unit to display a manipulation screen configured to support the touch manipulation, based on the command specified by the command specification unit.

(6) In the information processing apparatus according to any one of (1) to (5), the touch manipulation includes a flick manipulation in which a finger is caused to flick in a predetermined direction, and a hold manipulation in which the finger is caused to remain stationary on the touch panel, and the table includes a command to set an IN point to a play line area of a region on which focus is set, in regions included in the manipulation screen, as a command mapped onto a combination of the flick manipulation in the downward direction using one left finger and the hold manipulation using one right finger.

(7) In the information processing apparatus according to any one of (1) to (6), the touch manipulation includes the flick manipulation in which a finger is caused to flick in a predetermined direction, and the hold manipulation in which the finger is caused to remain stationary on the touch panel, and the table includes a command to set an OUT point to the play line area of the region on which the focus is set on, in the region included in the manipulation screen, as a command mapped onto a combination of the flick manipulation in the downward direction using one right finger and the hold manipulation using one left finger.

The present technology may be applied to the information processing apparatus that edits the content.

The present disclosure contains subject matter related to that disclosed in Japanese Priority Patent Application JP 2011-249998 filed in the Japan Patent Office on Nov. 15, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An editing apparatus for editing material by selecting and combining content portions of said material to produce edited material that is reproduced on a separate information processing apparatus, the editing apparatus comprising:
    a store of content material to be edited;
    a touch panel to be contacted by a user for producing edit commands;
    a contact detection unit that detects coordinates of a position of a touch manipulation with respect to the touch panel;
    a storage unit that stores a command table of edit commands for editing the content portions of said material and that at least includes a command to change a reproduction position of selected content portions of the material that is reproduced on the separate information processing apparatus, according to the changed reproduction position corresponding to a distance that the touch manipulation moves with respect to the touch panel;
    a command specification unit that specifies the command issued to the separate information processing apparatus, from the table stored in the storage unit, based on the detected coordinates and touch manipulation movement; and
    a display including an input material check region for displaying content portions of the material to be edited, an output material check region for displaying the edited material to be produced, and a focus-region display region for displaying a focus or command list selected by a user, the focus list identifying the content portions to be edited and the command list identifying predetermined edit commands, wherein the command specification unit issues commands to identify selected content portions displayed in the focus region and commands identifying selected edit operations based on the detected coordinates and movement of the touch manipulation.

2. The information processing apparatus according to claim 1, further comprising:
    a finger number determination unit that determines the number of fingers used in the touch manipulation, based on the detection result obtained by the contact detection unit; and
    a touch manipulation type determination unit that determines a type of touch manipulation, based on the detection result obtained by the contact detection unit,
    wherein the table includes the command mapped onto a predetermined combination of the number of fingers and the type of touch manipulation, and
    wherein the command specification unit recognizes the combination of the number of fingers and the type of touch manipulation, based on a determination result obtained by each of the finger number determination unit and the touch manipulation type determination unit, and specifies the command corresponding to the recognized combination, from the table stored in the storage unit.

3. The information processing apparatus according to claim 1, further comprising:
    a command issuing unit that issues the command specified by the command specification unit to the separate information processing apparatus.

4. The information processing apparatus according to claim 1, further comprising:
    a sensitivity adjustment unit that adjusts a sensitivity of the touch manipulation.

5. The information processing apparatus according to claim 1, further comprising:
    a display control unit that controls the display to display a manipulation screen configured to support the touch manipulation, based on the command specified by the command specification unit.

6. The information processing apparatus according to claim 5,
    wherein the touch manipulation includes a flick manipulation in which a finger is caused to flick in a predetermined direction, and a hold manipulation in which the finger is caused to remain stationary on the touch panel, and
    wherein the table includes a command to set an IN point to a play line area of a focus region included in the manipulation screen, as a command mapped onto a combination of the flick manipulation in the downward direction using one left finger and the hold manipulation using one right finger.

7. The information processing apparatus according to claim 5,
    wherein the touch manipulation includes a flick manipulation in which a finger is caused to flick in a predetermined direction, and a hold manipulation in which the finger is caused to remain stationary on the touch panel, and
    wherein the table includes a command to set an OUT point to a play line area of a focus region included in the manipulation screen, as a command mapped onto a combination of the flick manipulation in the downward direction using one right finger and the hold manipulation using one left finger.

8. An editing method for editing material by selecting and combining content portions of said material to produce edited material that is reproduced on a separate information processing apparatus, the editing method comprising:
    detecting coordinates of a position of touch manipulation with respect to a touch panel to produce edit commands;
    storing a command table of editing commands for editing the content portions of the material and that at least includes a command to change a reproduction position of selected content portions of the material that is reproduced on the separate information processing apparatus, according to the changed reproduction position corresponding to a distance that the touch manipulation moves with respect to the touch panel;

specifying the command issued to the separate information processing apparatus, from the stored table, based on the detected coordinates and touch manipulation movement; and displaying in an input material check region content portions of the material to be edited, displaying in an output material check region the edited material to be produced, and displaying in a focus region a focus or command list selected by a user, the focus list identifying the content portions to be edited and the command list identifying predetermined edit commands, wherein the specified command identifies selected content portions displayed in the focus region or selected edit operations based on the detected coordinates and movement of the touch manipulation.

9. A non-transitory computer-readable record medium storing a program that, when read causes a computer to execute an editing operation for editing material by selecting and combining content portions of said material to produce edited material that is reproduced on a separate information processing apparatus, comprising:

detecting coordinates of a position of a touch manipulation with respect to a touch panel to produce edit commands;

storing a command table of editing commands for editing the content portions of the material and that at least includes a command to change a reproduction position of selected content portions of the material reproduced in the separate information processing apparatus, according to the changed reproduction position corresponding to a distance that the touch manipulation moves with respect to the touch panel;

specifying the command issued to the separate information processing apparatus, from the stored table, based on the detected coordinates and touch manipulation movement; and displaying in an input material check region content portions of the material to be edited, displaying in an output material check region the edited material to be produced, and displaying in a focus region a focus or command list selected by a user, the focus list identifying the content portions to be edited and the command list identifying predetermined edit commands, wherein the specified command identifies selected content portions displayed in the focus region or selected edit operations based on the detected coordinates and movement of the touch manipulation.

* * * * *